(12) United States Patent
Shepard et al.

(10) Patent No.: US 11,474,059 B2
(45) Date of Patent: Oct. 18, 2022

(54) THERMOGRAPHIC NON-DESTRUCTIVE TESTING USING TEMPERATURE-LIMITED MODULATION

(71) Applicant: Thermal Wave Imaging, Inc., Madison Heights, MI (US)

(72) Inventors: Steven M. Shepard, Southfield, MI (US); Maria Frendberg Beemer, Clarkston, MI (US)

(73) Assignee: Thermal Wave Imaging, Inc., Madison Heights, MI (US)

( * ) Notice: Subject to any disclaimer, the term of this patent is extended or adjusted under 35 U.S.C. 154(b) by 0 days.

(21) Appl. No.: 17/242,000

(22) Filed: Apr. 27, 2021

(65) Prior Publication Data

US 2021/0341403 A1 Nov. 4, 2021

Related U.S. Application Data

(60) Provisional application No. 63/017,158, filed on Apr. 29, 2020.

(51) Int. Cl.
*G01N 25/72* (2006.01)
*G01J 5/10* (2006.01)
*G01J 5/00* (2022.01)
*G01J 5/48* (2022.01)

(52) U.S. Cl.
CPC ............... *G01N 25/72* (2013.01); *G01J 5/10* (2013.01); *G01J 5/48* (2013.01); *G01J 2005/0077* (2013.01)

(58) Field of Classification Search
CPC .... G01N 25/72; G01J 5/10; G01J 5/48; G01J 2005/0077; G06T 2207/10016; G06T 2207/30164; G06T 7/0004; G06T 2207/10048
See application file for complete search history.

(56) References Cited

U.S. PATENT DOCUMENTS

| | | | |
|---|---|---|---|
| 2017/0221778 A1 | 8/2017 | Mehendale et al. | |
| 2018/0321140 A1* | 11/2018 | Boudin | G01J 5/0896 |
| 2019/0303711 A1* | 10/2019 | Kalivas | G06K 9/6267 |
| 2021/0341403 A1 | 11/2021 | Shepard et al. | |

FOREIGN PATENT DOCUMENTS

KR 20180038672 A 4/2018

OTHER PUBLICATIONS

International Search Report and Written Opinion for Application PCT/US2021/029458 dated Feb. 21, 2022.

* cited by examiner

*Primary Examiner* — David P Porta
*Assistant Examiner* — Meenakshi S Sahu
(74) *Attorney, Agent, or Firm* — Honigman LLP

(57) ABSTRACT

A method for performing non-destructive testing using active thermography includes applying, using at least one thermal excitation device, a first excitation pulse to a workpiece; capturing, using an imaging device, a first iso-time frame of the workpiece; and determining a second excitation pulse by modifying one or more of a duration D of the first excitation pulse, an amplitude A of the first excitation pulse, or a spacing W between the first excitation pulse and the second excitation pulse. The method also includes applying, using the at least one of the thermal excitation device, the second excitation pulse to the workpiece; capturing, using the imaging device, a second iso-time frame of the workpiece; and determining a numerical fit of the first iso-time frame and the second iso-time frame.

20 Claims, 12 Drawing Sheets

THERMOGRAPHIC NON-DESTRUCTIVE TESTING USING TEMPERATURE-LIMITED MODULATION

CROSS-REFERENCE TO RELATED APPLICATIONS

This application claims priority under 35 U.S.C. § 119(e) to U.S. Provisional Patent Application No. 63/017,158, filed on Apr. 29, 2020, the contents of which is considered part of the disclosure of this application and is hereby incorporated by reference in its entirety.

GOVERNMENT LICENSE RIGHTS

This invention was made with government support under contract N68335-14-C-0310 awarded by Naval Aircraft Warfare Ctr Aircraft Division. The government has certain rights in the invention.

TECHNICAL FIELD

This disclosure relates to systems and methods for performing non-destructive testing using active thermography, and more particularly to thermographic non-destructive testing using temperature-limited modulation.

BACKGROUND

In thermographic non-destructive testing, the surface of a solid sample is heated by some means and the temperature of the surface is monitored using an infrared camera. Thermal energy uniformly deposited at the surface of the sample will diffuse into the volume of the sample. The response of the temperature of the surface to heating will depend on how the heat is applied. For example, for an infinitely thick sample, continuous excitation will cause the surface temperature to rise monotonically, while the response to a transient pulse with finite duration will be a monotonically falling average temperature. For an infinitely thick sample heated by a uniform, instantaneous pulse, the surface cools with average temperature that is proportional to $1/\sqrt(t)$, where t is the elapsed time, measured relative to the delivery of the pulse. A temporally extended pulse converges to the same behavior after an initial time. For continuous or modulated heating, the surface temperature increases, rather than decreases, in proportion to $\sqrt(t)$. Viewed on a double logarithmic scale, these responses are straight lines with slope −0.5 and 0.5, respectively. However, the presence of a subsurface feature (e.g., void, inclusion or change in thermal conductivity or thermal diffusivity) that affects the flow of heat from the surface into the sample will also affect the surface temperature, causing a deviation from this linear slope response.

In transient, modulated, and steady state excitation approaches, the deviation from expected surface temperature response due to a subsurface feature occurs at a time that is proportional to the square of its depth. In the transient case, where the surface temperature is decreasing, detection of deeper subsurface features becomes increasingly difficult as the difference between normal and anomalous temperatures becomes smaller and approaches the detection limit of the IR camera. Spurious contributions, including electronic and thermal noise and incident background radiation, also contribute to the IR camera signal and may mask the small temperature deviations associated with a subsurface feature. The difference between normal and anomalous surface temperatures can be increased by proportionally increasing the excitation energy. However, this also increases the difference between the temperature of the surface of the sample and the ambient temperature, to the extent that energy transfer by convection may become comparable or greater than thermal diffusion, thus impeding detection of subsurface features.

While known thermographic non-destructive testing systems and methods have proven to be acceptable for various applications, such systems and methods are nevertheless susceptible to improvements that may enhance their overall performance and cost. Therefore, a need exists to develop non-destructive testing systems and methods that advance the art.

SUMMARY

One aspect of the disclosure provides a computer-implemented method when executed on data processing hardware causes the data processing hardware to perform operations for a method of performing non-destructive testing using active thermography. The operations include applying, using at least one thermal excitation device, a first excitation pulse to a workpiece; capturing, using an imaging device, a first iso-time frame of the workpiece; and determining a second excitation pulse by modifying one or more of a duration D of the first excitation pulse, an amplitude A of the first excitation pulse, or a spacing W between the first excitation pulse and the second excitation pulse; The operations also include applying, using the at least one of the thermal excitation device, the second excitation pulse to the workpiece; capturing, using the imaging device, a second iso-time frame of the workpiece; and determining a numerical fit of the first iso-time frame and the second iso-time frame.

Implementations of the disclosure may include one or more of the following optional features. In some implementations, the operations further include displaying, on a display, the first iso-time frame, the second iso-time frame, the numerical fit of the first iso-time frame and the second iso-time frame, a derivative of the numerical fit of the first iso-time frame and the second iso-time frame, or attribute time frames. Additionally, the operations may also include determining a target temperature range for the workpiece based on the first excitation pulse. Here, determining the second excitation pulse by modifying one or more of a duration D of the first excitation pulse, an amplitude A of the first excitation pulse, or a spacing W between the first excitation pulse and the second excitation pulse may be responsive to determining the target temperature range for the workpiece. In some examples, determining the second excitation pulse by modifying one or more of a duration D of the first excitation pulse, an amplitude A of the first excitation pulse, or a spacing W between the first excitation pulse and the second excitation pulse includes operating the at least one thermal excitation device for maintaining a temperature of the workpiece that is equal to a temperature that is within the target temperature range for the workpiece.

In some examples, the operations also include analyzing at least one image captured by the imaging device for identifying an anomaly of the workpiece from the numerical fit of the first iso-time frame and the second iso-time frame. In these examples, the operations may also include identifying one or more discontinuities within the workpiece based on the identified anomaly of the workpiece. For instance, the one or more discontinuities may include one or more voids or cavities within the workpiece and/or a first material disposed within the one or more voids or cavities within the workpiece. Here, the first material is different than a second material surrounding the first material. Optionally, the one or more discontinuities may include a disbond region where a first outer layer of material of the workpiece may be otherwise bonded to or directly connected to a second inner layer of material of the workpiece.

Another aspect of the present disclosure provides a system for performing non-destructive testing using active thermography. The system includes at least one thermal excitation device an imaging device data processing hardware and memory hardware in communication with the data processing hardware and storing instructions that when executed on the data processing hardware causes the data processing hardware to perform operations. The operations include applying, using at least one thermal excitation device, a first excitation pulse to a workpiece; capturing, using an imaging device, a first iso-time frame of the workpiece; and determining a second excitation pulse by modifying one or more of a duration D of the first excitation pulse, an amplitude A of the first excitation pulse, or a spacing W between the first excitation pulse and the second excitation pulse; The operations also include applying, using the at least one of the thermal excitation device, the second excitation pulse to the workpiece; capturing, using the imaging device, a second iso-time frame of the workpiece; and determining a numerical fit of the first iso-time frame and the second iso-time frame.

Implementations of the disclosure may include one or more of the following optional features. In some implementations, the operations further include displaying, on a display, the first iso-time frame, the second iso-time frame, the numerical fit of the first iso-time frame and the second iso-time frame, a derivative of the numerical fit of the first iso-time frame and the second iso-time frame, or attribute time frames. Additionally, the operations may also include determining a target temperature range for the workpiece based on the first excitation pulse. Here, determining the second excitation pulse by modifying one or more of a duration D of the first excitation pulse, an amplitude A of the first excitation pulse, or a spacing W between the first excitation pulse and the second excitation pulse may be responsive to determining the target temperature range for the workpiece. In some examples, determining the second excitation pulse by modifying one or more of a duration D of the first excitation pulse, an amplitude A of the first excitation pulse, or a spacing W between the first excitation pulse and the second excitation pulse includes operating the at least one thermal excitation device for maintaining a temperature of the workpiece that is equal to a temperature that is within the target temperature range for the workpiece.

In some examples, the operations also include analyzing at least one image captured by the imaging device for identifying an anomaly of the workpiece from the numerical fit of the first iso-time frame and the second iso-time frame. In these examples, the operations may also include identifying one or more discontinuities within the workpiece based on the identified anomaly of the workpiece. For instance, the one or more discontinuities may include one or more voids or cavities within the workpiece and/or a first material disposed within the one or more voids or cavities within the workpiece. Here, the first material is different than a second material surrounding the first material. Optionally, the one or more discontinuities may include a disbond region where a first outer layer of material of the workpiece may be otherwise bonded to or directly connected to a second inner layer of material of the workpiece.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure provides a system that performs Non-Destructive Testing (NDT) using active thermography that is based on controlling an intermittent sequence of excitation pulses that is applied to a test sample so that its surface temperature change is held within a relatively small range. Exemplary methods described in the present disclosure involve both hardware and software that results in one or more images that show discrete subsurface discontinuities (e.g., adhesive disbonds, delamination or inclusions (such as, e.g., water, ice, or the like) or spatially extended subsurface discontinuities (e.g., layer boundaries) in composite materials, metallic materials, polymeric materials, ceramic materials, or the like.

The systems and method of the present disclosure (1) provide greater depth range and sensitivity to deeper defects and discontinuities; (2) are less susceptible to reflection artifacts or parasitic convection effects; (3) provide results that can be viewed in real time, while inspection is being performed; (4) can be used with a range of excitation sources (e.g., flash lamps, heat lamps, sonic heating, induction heating, and the like); (5) offer sensitivity to spatially extended subsurface interfaces (e.g., layer boundaries) as well as discrete defects; (6) offer sensitivity to subsurface variations in thermal mass and heat capacity; (7) do not require reference standard or comparison to a defect-free sample or region; (8) allow quantitative measurement of depth, thickness, or thermal diffusivity; and (9) allow inspection of an area greater than the infrared (IR) camera field of view in a single inspection period.

Figure 1:
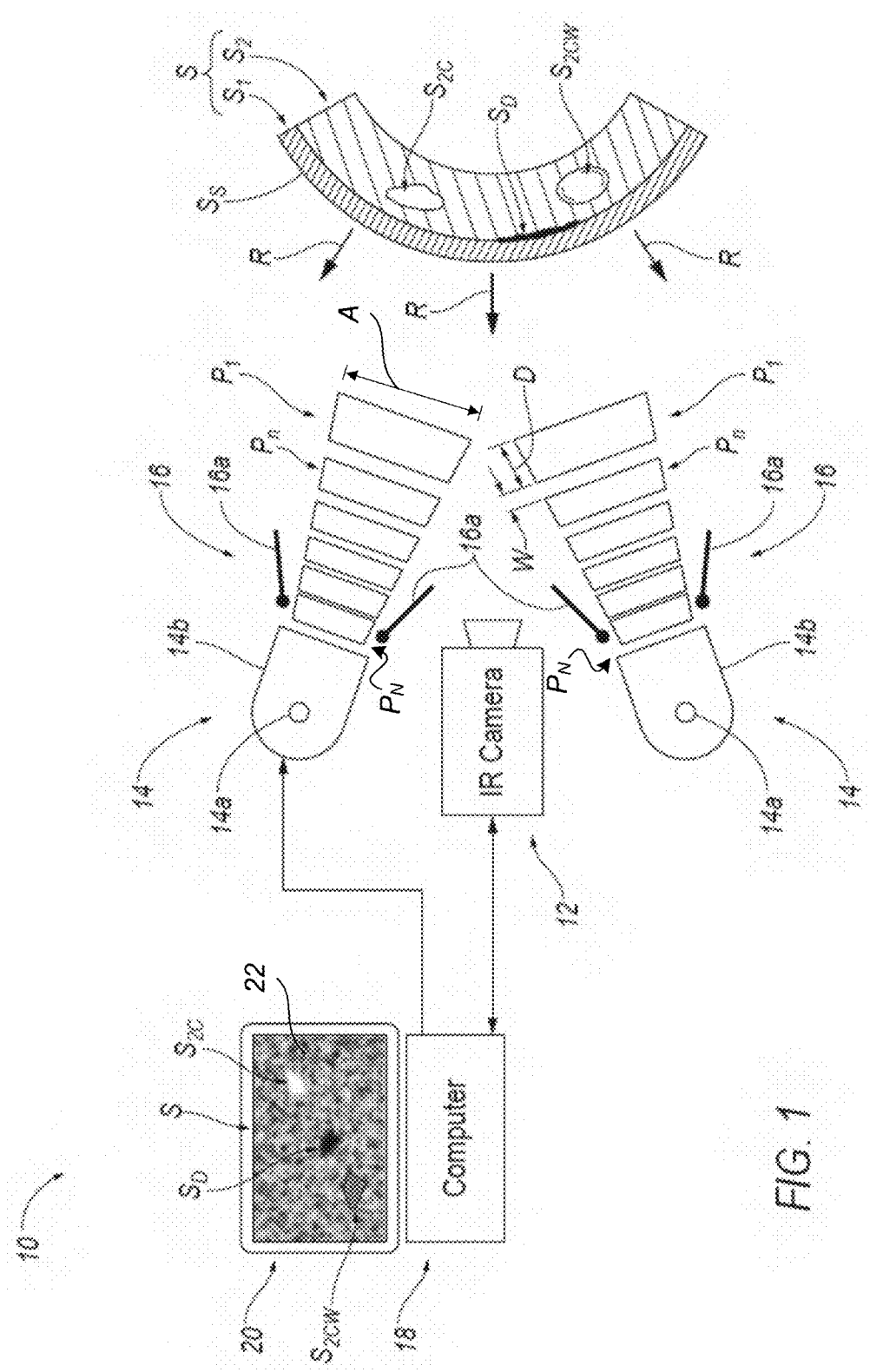
FIG. 1 is a schematic view of a temperature-limited modulation system, in accordance with the principals of the present disclosure.

With reference to FIG. 1, one aspect of the disclosure provides a system 10 that measures the surface temperature (see, e.g., emitted radiation R, which may be, for example, IR radiation) of a test sample S, which may hereinafter be referred to as a workpiece, while an intermittent sequence of excitation pulses is applied to the sample. As seen at FIG. 1, the workpiece S may include a first outer layer of material $S_1$, and a second inner layer of material $S_2$, where the first outer layer of material $S_1$ and the second outer layer of material $S_2$ may be either the same material or different materials. It will be appreciated that, in some implementations, the workpiece S includes more than two layers of materials. The second inner layer of material $S_2$ may include, for example, one or more subsurface features, imperfections, or inconsistencies; the one or more subsurface features, imperfections, or inconsistencies may include, for example: one or more voids or cavities $S_{2C}$, water $S_{2CW}$ that is contained within the one or more voids or cavities $S_{2C}$, or the like. Furthermore, the workpiece S may include a disbond region $S_D$ where the first outer layer of material $S_1$ may be otherwise bonded to or directly connected to the second inner layer of material $S_2$. In some implementations, the workpiece S may include a portion of an aircraft (e.g., a wing or other portion of a jet); however, the system 10 and methods described herein can be utilized independent of the location, form, type, etc. of the workpiece S.

Figure 7:
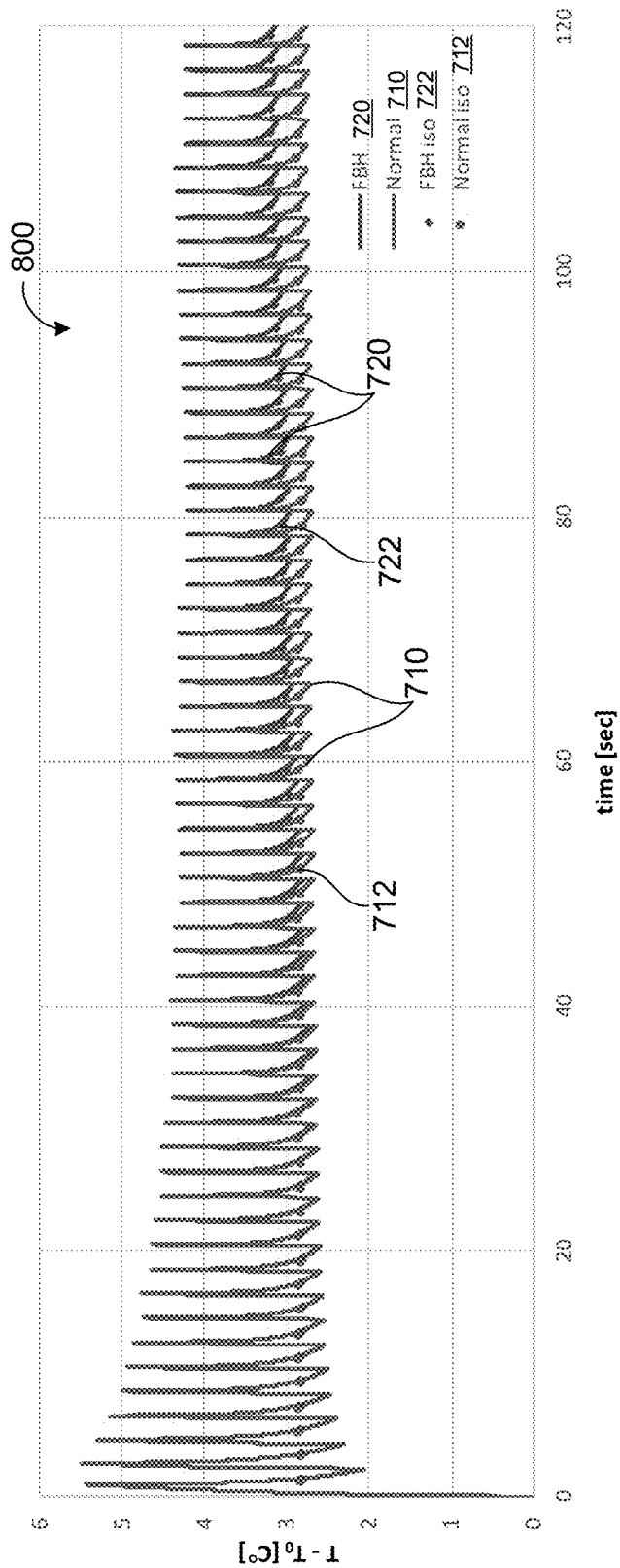
FIG. 7 illustrates an experimental plot of temperature responses of a normal workpiece and a workpiece with a flat back hole when temperature-limited modulation is applied.

The system 10 may include an imaging device 12 (e.g., an IR camera), one or more heating devices 14 (each heating device 14 of which may include, e.g., a lamp 14a arranged within a reflector 14b) including a shutter mechanism 16, and a computing device 18 (see also, e.g., FIG. 7). The imaging device 12 and the one or more heating devices 14 are communicatively-coupled to the computing device 18 for obtaining data from and/or operating one or both of the imaging device 12 and the one or more heating devices 14. In the example shown, the computing device 18 instructs the one or more heating devices 14 to apply a sequence of intermittent excitation pulses $P_1$-$P_N$ to the workpiece S to hold surface temperature change within a relatively small range in order to inspect the workpiece S for subsurface discontinuities. While the example shows each heating device 14 applying a sequence of six excitation pulses P for simplicity, the number N of excitation pulses in the sequence may include any number N of excitation pulses. Each excitation pulse P is applied to the workpiece S during an "ON cycle" where an intensity of the one or more heating devices 14 is controlled to supply a voltage for heating the surface of the workpiece S and the shutter 16 is in an open position. In some instances, after the one or more heating devices 14 apply an initial/first excitation pulse $P_1$ for a duration D and having an amplitude A corresponding to a magnitude of energy/heat output (that may occur in response to, for example, arranging the shutter 16 from a closed orientation to an open orientation (as seen at FIG. 1) and back to the closed orientation), a characteristic (e.g., a duration D, amplitude A and/or spacing W) of each subsequent pulse $P_n$ in the sequence is chosen so that an average surface temperature (see, e.g., emitted radiation R at FIG. 1 travelling away from an outer surface $S_S$ of the workpiece S) of the workpiece S at a given time relative to the previous pulse $P_{n-1}$ remains stable over the duration of the inspection of the workpiece S. As will become apparent, stabilizing the average surface temperature of the workpiece S drastically minimizes convection occurring at the surface of the workpiece, and therefore, improves the accuracy of detecting subsurface discontinuities via active thermography. The duration D, amplitude A and/or spacing W of each pulse $P_n$ in the pulse sequence $P_1$-$P_N$ may be predetermined or may be computed during the "OFF cycle" following the previous pulse $P_{n-1}$ using feedback from the imaging device 12 or other techniques.

During an "OFF cycle" (e.g., when the shutter 16 is arranged in the closed orientation and/or the voltage supplied to the one or more heating devices 14 is decreased from the voltage applied during the ON cycle) of each pulse $P_n$, a single image frame 22 (or average of consecutive frames) captured by the imaging device 12 at a given time after the initiation of the "OFF cycle" (or after the center point of a previous "ON cycle" (e.g., when the shutter 16 is arranged in the open orientation)) is captured, so that at the end of data acquisition comprising N excitation pulses, N frames representing similar times in the "OFF cycle" will be captured. Each frame may include either (i) the raw image obtained by the imaging device 12 after applying the pulse $P_n$ or (2) the difference between the raw images obtained by the imaging device 12 before the initial "ON cycle" $P_1$ (i.e. the preflash) and the raw image obtained by the imaging device 12 after applying the pulse $P_n$. A numerical (e.g., least-squares) fit using a polynomial function of time (relative to the initiation of the first pulse $P_1$) or other function is performed on the sequence of N "iso-time" frames for every pixel in the field of view of the imaging device 12. Because the number of iso-time frames is relatively low relative to a sequence of continuous frames at the frame rate of the imaging device 12, the fit may be performed once, after the entire sequence has been captured, or after each iso-time frame is captured, so that the operator of the system 10 can see the interim result as the inspection is being performed.

In some implementations, the displayed images 22 (e.g., on a display 20 of the computing device 18) include (i) the raw images obtained by the imagine device 12 and/or (ii) fit images based on the numerical fit function. The fit images may include the fit image and/or time derivatives (e.g., the $1^{st}$ derivative or the $2^{nd}$ derivative) of the fit image, whereby the time derivatives may eliminate most steady state temperature differences due to IR emissivity of the workpiece S or non-uniform heating. As such, the fit images and/or the time derivatives of the fit images provide significant enhancement of signals indicating subsurface features/discontinuities (e.g., one or more voids or cavities $S_{2C}$, water $S_{2CW}$ that is contained within the one or more voids or cavities $S_{2C}$, disbond region $S_D$, or the like).

In thermographic NDT, when an outer surface (see, e.g., outer surface $S_S$ at FIG. 1) of a solid workpiece S is heated by the one or more heating devices 14, thermal energy (see, e.g., a representative pulse $P_n$ at FIG. 1) is uniformly deposited at the outer surface $S_S$ of the workpiece S and will thereafter diffuse into the volume of the sample via thermal conduction. The response of the temperature associated with the emitted radiation R of the outer surface $S_S$ of the workpiece S to the applied heat from the one or more heating devices 14 depends on how the heat pulse P is applied. FIG.

2 shows an exemplary plot of depicting surface temperature change responsive to heating a workpiece S via various conventional thermographic NDT techniques. The x-axis denotes time in seconds (sec), displayed on a logarithmic scale, and the y-axis denotes surface temperature change in degrees Celsius (C), displayed on a logarithmic scale. Response lines 54 and 56 depict application of continuous and modulated excitation pulses, respectively, to an infinitely thick workpiece that causes the surface temperature associated with the emitted radiation R at the outer surface $S_S$ of the workpiece S to rise, while response line 52 indicates the response to a transient/flash pulse P with finite duration as a monotonically falling average temperature associated with the emitted radiation R. For an infinitely thick sample, the average temperature response associated with the emitted radiation R at the outer surface $S_S$ of the workpiece S may be proportional to $1/\sqrt{(t)}$ for the instantaneous pulse (i.e., a step pulse response 53 converges to the same behavior), and $\sqrt{(t)}$ for continuous or modulated heating.

Figure 2:
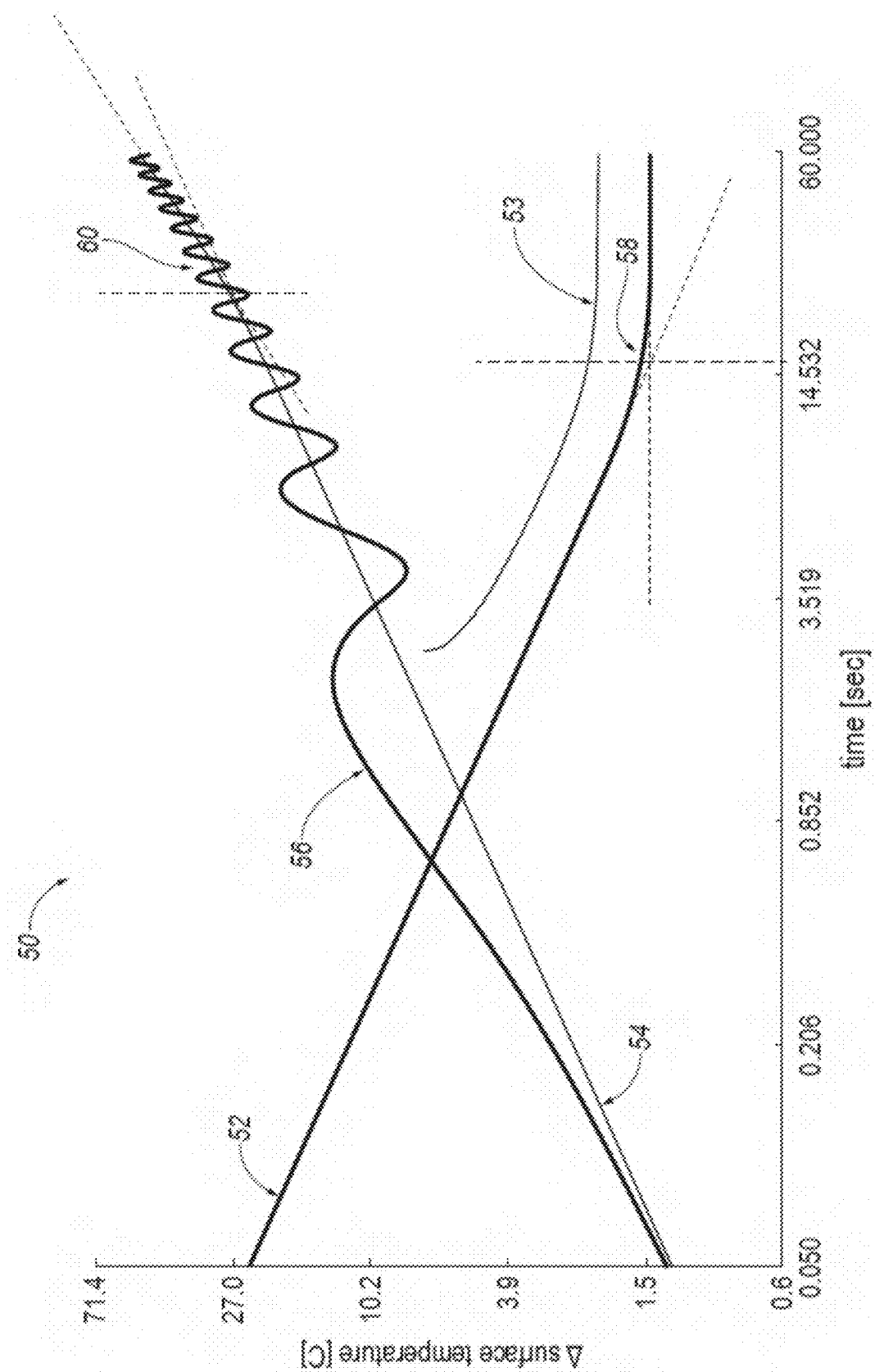
FIG. 2 is a plot (shown on a double logarithmic scale) of a temperature versus time response of a flash, temporally extended pulse, constant, step and modulated heating of a 3 mm thick carbon fiber panel, in accordance with the principals of the present disclosure.

As shown in the plot of FIG. 2, when viewed on a double logarithmic scale 50, these responses from the conventional thermographic NDT techniques are straight lines with the response line 52 associated with the instantaneous or extended flash pulse having a first slope of about −0.5 and the response lines 54, 56 associated with constant or the trend of modulated heating of the workpiece S having a second slope of +0.5. The presence of at least one subsurface feature $S_{2C}$, $S_{2CW}$, $S_D$ that modifies the flow of heat of the flash or pulse P from the outer surface $S_S$ of the workpiece S into the material volume of the workpiece S will affect the surface temperature associated with the emitted radiation R, causing a deviation 58, 60 from the linear slope of the respective response line 52, 54.

Accordingly, as described above, the deviation 58, 60 from expected temperature response associated with the emitted radiation R arising from, for example, a subsurface feature $S_{2C}$, $S_{2CW}$, $S_D$ occurs in the sequence, at a time proportional to square of the depth of the subsurface feature $S_{2C}$, $S_{2CW}$, $S_D$, and the maximum temperature difference between the feature and nearby normal areas decreases as the depth of the feature increases. In the transient case, where the signal is decreasing, the difference between the preheating signal and later signals will be closer to the detection limit of the imaging device 12, so that both noise and background radiation may mask small deviations in temperature associated with the emitted radiation R that corresponds to a detected subsurface feature $S_{2C}$, $S_{2CW}$, $S_D$. If, for example, a user of the system 10 attempts to manually compensate for the above-described scenario by, for example, increasing the energy of the excitation pulse P provided by the one or more heating devices 14, the increased temperature also increases the difference between the temperature associated with the emitted radiation R of the outer surface $S_S$ of the workpiece S and ambient temperatures, to the extent that energy transfer by convection may become comparable or greater than thermal diffusion, thus impeding detection of subsurface features $S_{2C}$, $S_{2CW}$, $S_D$.

In the constant or modulated excitation mode of the system 10, the average temperature associated with the emitted radiation R of the outer surface $S_S$ of the workpiece S increases with respect to time; a longer acquisition period of the imaging device 12 may be employed to permit deeper penetration of the heat associated with the excitation pulse P. As such, the temperature associated with the emitted radiation R of the outer surface $S_S$ may increase beyond the limited dynamic range of the imaging device 12. Furthermore, as the temperature associated with the emitted radiation R of the workpiece S increases over time with respect to the ambient temperature, convection plays an increasingly dominant, parasitic role by transferring energy to or from an ambient fluid (e.g., air) that surrounds the workpiece S, thereby reducing the heat conduction into the workpiece S and the signal response that is detected by the imaging device 12 that ultimately results in a positive indication of a subsurface feature $S_{2C}$, $S_{2CW}$, $S_D$.

Figure 3:
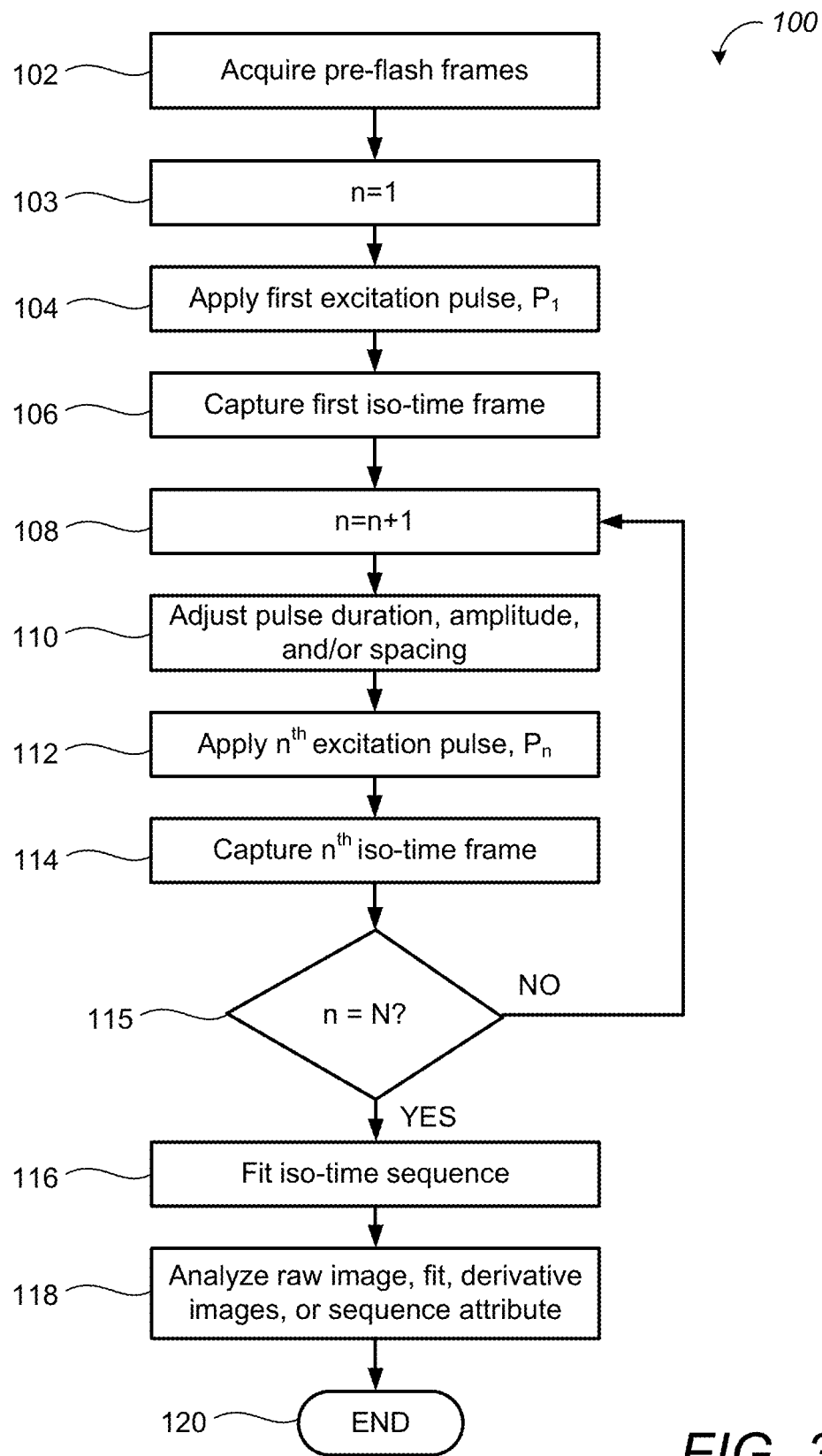
FIG. 3 is a flowchart of a temperature-limited modulation process calculated after an entire sequence has been acquired, in accordance with the principals of the present disclosure.
Figure 4:
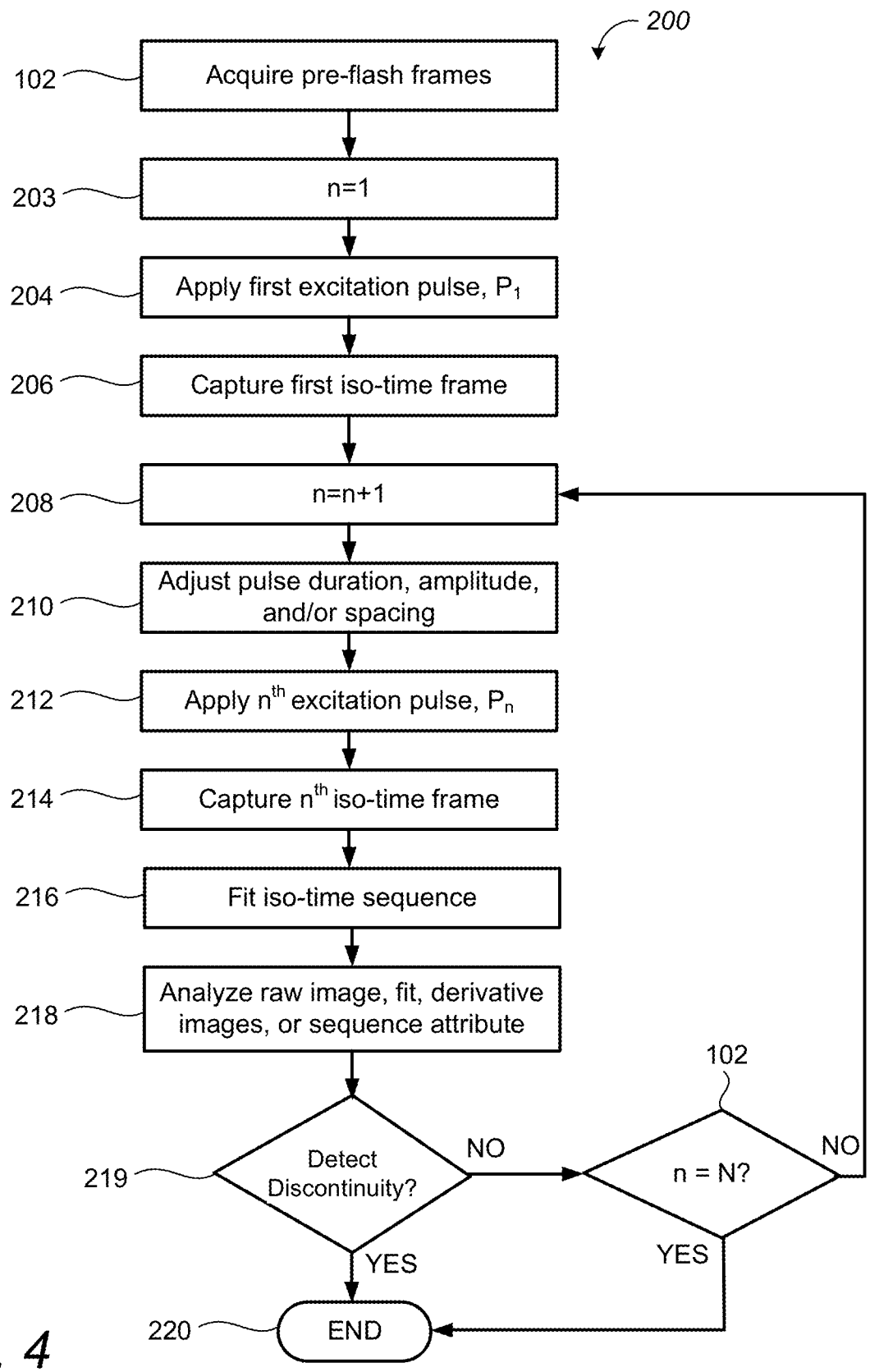
FIG. 4 is a flowchart of a temperature-limited modulation process calculated after each cycle has been acquired, in accordance with the principals of the present disclosure.

FIGS. 3 and 4 provide flowcharts for example sets of steps for methods 100, 200 of operating the system 10 of FIG. 1 to inspect the workpiece W for subsurface discontinuities. The methods 100, 200 may execute on a processor (e.g., data processing hardware) of the computing device 18. At a first step 102, 202, the imaging device 12 acquires pre-flash frames of the workpiece W and subsequently, the computing device 18 initiates the sequence of excitation pulses P by setting a counter value n for the current pulse equal to one (n=1) at step 103, 203 and instructing the one or more heating devices 14 to apply an initial/first excitation pulse $P_1$ during step 104, 204. That is, at step 104, 204, the method 100, 200 initiates an initial/first "ON cycle" by supplying voltage to the one or more heating devices 14 sufficient to heat the surface of the workpiece W and instructing the shutter 16 to be in the open position. Thereafter, the method 100, 200 initiates an initial/first "OFF cycle" to cease application of the first excitation pulse $P_1$ and the imaging device 12 may capture an iso-time frame at step 106, 206 of the emitted radiation R of the outer surface $S_S$ of the workpiece S. In some examples, prior to initiating the first "OFF cycle", the imaging device 12 captures an initial/first reflected IR image of the surface of the workpiece W during the "ON cycle" while the heating device 14 is applying the first excitation pulse $P_1$.

As will be described herein, after initially activating the one or more heating devices 14 to apply the first excitation pulse $P_1$ at step 104, 204, the one or more heating devices 14 may be subsequently activated during respective subsequent "ON cycles" to provide one or more subsequent excitation pulses $P_2$, $P_3$, . . . , $P_n$, $P_N$ (e.g., an "$N^{th}$ excitation pulse" being a last excitation pulse $P_N$ and one or more intervening excitation pulses $P_n$) in order to continue to add additional heat energy to the workpiece S so that heat associated with the intermittent sequence of excitation pulses P impinging upon the outer surface $S_S$ continues to penetrate deeper into the workpiece S, but without incurring substantial fluctuation in surface temperature of the workpiece S. After capturing the first iso-time frame at step 106, 206, the method 100, 200 sets the counter value n for the current pulse equal to n+1 at step 108, 208 and then adjusts, at step 110, 210, at least one of the spacing W between previous excitation pulse $P_{n-1}$ and the next excitation pulse $P_n$, the duration D of the next excitation pulse $P_n$, or the amplitude A of the next excitation pulse $P_n$ to be applied during the next "ON Cycle" at step 112, 212. In some examples, at step 110, 210, the method 100, 200 adjusts the aforementioned spacing W, amplitude A, and/or duration D based on a temperature of the outer surface $S_S$ of the workpiece S measured during the previous cycle n−1. Additionally or alternatively, the adjustment to the spacing W, amplitude A, and/or duration D may be set to predetermined values based on, for example, properties of the workpiece W being inspected and/or the types of subsurface discontinuities of interest.

By adjusting the duration D, amplitude A, and/or spacing W of each subsequent excitation pulse $P_2$, $P_3$, . . . $P_N$, the temperature associated with the emitted radiation R of the outer surface $S_S$ is not substantially increased such that convection is relatively constant throughout the entire sequence of providing the excitation pulses P. Rather than the computing device 18 analyzing an ascending or descending signal captured by the imaging device 12, the imaging device 12 will provide to the computing device 18 a relatively flat signal of, for example, iso-time frames (see, e.g., steps 106, 114 and 206, 214) that are captured during the "OFF cycles" of the system 10. The computing device 18 may perform (e.g., at step 116, 216) a numerical (e.g., least-squares) fit with a simple function (e.g. low-order polynomial) in order to create a smooth replica of the time history that can be easily operated on mathematically (e.g. differentiated) to enhance, isolate, or characterize subsurface features $S_{2C}$, $S_{2CW}$, $S_D$ of the workpiece S. Furthermore, the shutters 16 may also block heat/radiation from warm hardware associated with the system 10, thereby minimizing reflection artifacts from the workpiece W in order to permit the imaging device 12 to optimize collection of emitted radiation R from the workpiece S associated with the excitation pulses P.

Referring back to FIG. 1, at least one of the one or more heating devices 14 may include a halogen lamp 14a. However, other types of heating devices 14 may be implemented by the system 10 for applying excitation pulses P such as, without limitation, flash lamps, hot air, sonic excitation, electromagnetic induction, or the like.

In some examples, the imaging device 12 includes an infrared (IR) camera. The imaging device 12 may be focused on the outer surface $S_S$ of the workpiece S and the surface temperature associated with the emitted radiation R from the outer surface $S_S$ of the workpiece S is recorded (either continuously, or, alternatively, at "iso-times" relative to each excitation pulse $P_n$ event, which may be triggered by the computing device 18) over the entire inspection cycle that may begin before (see, e.g., step 102, 202) the first excitation pulse in order (see, e.g., step 104, 204) to establish a baseline temperature of the outer surface $S_S$ of the workpiece S. In this regard, the acquisition of an "iso-time frame" by the imaging device may include the acquisition of an image, temperature, or other characteristic of the outer surface $S_S$ of the workpiece S at a particular time.

In some configurations, each heating device 14 may include, for example, a halogen lamp 14a (e.g., 500 Watt 5" lamp) that is housed within a reflector 14b, which may be, for example, a parabolic reflector that directs radiation P emitted from the halogen lamp 14a onto the outer surface $S_S$ of the workpiece S. An optional shutter 16 may be arranged near, proximate, or at an exit aperture of each reflector 14b that contains the halogen lamp 14a. The computing device 18 may be configured to mechanically actuate the shutter 16 between: (1) an open orientation during an "ON Cycle" that results in the excitation pulse P being directed toward the outer surface $S_S$ of the workpiece S; and (2) a closed orientation in order to block radiation from the hardware 14a, 14b associated with the one or more heating devices 14 in order to prevent unintended directional radiation from reaching the outer surface $S_S$ of the workpiece S during "OFF cycles" of the system 10. Furthermore, in some configurations, a surface 16a of the shutter 16 that faces the halogen lamp 14a is provided with a reflective material (e.g., a gold coating or an aluminum coating) with broadband reflective properties in order to minimize heating of the shutter 16. Yet even further, in some implementations, the lamp 14a is cooled by a fan (not shown) that may operate either continuously, or, alternatively, during an "OFF cycle" in order to optimize performance of the lamp 14a, and, by extension, optimal performance of the system 10.

Referring back to the methods 100, 200 of FIGS. 3 and 4, after adjusting/setting the spacing W between previous excitation pulse $P_{n-1}$ and the next excitation pulse $P_n$, the duration D of the next excitation pulse $P_n$ or the amplitude A of the next excitation pulse $P_n$ at step 110, 210, the method 100, 200 initiates the next "ON cycle" to cause the one or more heating devices 14 to apply the subsequent $n^{th}$ excitation pulse $P_n$ to the workpiece S at step 112, 212. Thereafter, the methods 100, 200 initiates the $n^{th}$ "OFF Cycle" to cease application of the excitation pulse $P_n$ and the imaging device 12 captures an $n^{th}$ iso-time frame at step 114, 214 of the emitted radiation R of the outer surface $S_S$ of the workpiece S. In some examples, prior to initiating the first "OFF Cycle", the imaging device 12 captures an $n^{th}$ reflected IR image of the outer surface $S_S$ of the workpiece S during the "ON Cycle" while the heating device 14 is applying the excitation pulse $P_n$. Additionally or alternatively, the method 100, 200 may optionally capture an $n^{th}$ reflected IR image of the outer surface $S_S$ of the workpiece S during the $n^{th}$ "OFF Cycle".

As seen at step 110, 210, after setting the counter "n" to the value "n+1" at step 108, 208, the computing device 18 is configured to operate the one or more heating devices 14 such that the heat arising from subsequent excitation pulses $P_2$, $P_3$, ... $P_N$ may be applied with, for example, either a fixed or varying spacing W between the end of pulse $P_{n-1}$ and the start of pulse $P_n$. Furthermore, at step 110, 210, subsequent excitation pulses $P_2$, $P_3$, ... $P_N$ may be applied with a variable duration D. Yet even further, at step 110, 210, subsequent excitation pulses $P_2$, $P_3$, ... $P_n$ may be applied with a variable amplitude A. As such, after an adjustment of the one or more heating devices 14 at step 110, 210, the methods 100, 200 may apply, at step 112, 212, a subsequent (e.g., "$n^{th}$") excitation pulse $P_n$ that has been changed (with respect to one or a combination of spacing W, duration D, and amplitude A) with respect to a previously-applied excitation pulse $P_{n-1}$.

Referring to FIG. 3, the method 100 includes a decision step 115 that determines whether or not the current counter value n is equal to a predetermined counter limit "N". The counter limit N may be configurable and set to a value based on properties (e.g., material and/or thickness) of the workpiece S and/or one or more subsurface discontinuities of interest. Accordingly, when the current counter value n is not equal to the counter limit N (i.e., decision step 115 is "NO"), the method 100 reverts back to step 108 and increments the counter value and repeats steps 110-115. Conversely, once the counter value n is equal to the counter limit N (i.e., decision step 115 is "YES"), the method 100 proceeds/advances to step 116 (i.e., advancing from decision step 115 to step 116 infers that a full sequence of iso-time frames have been acquired/captured by the imaging device 12 and provided to the computing device 18). Accordingly, after a full sequence of N iso-time frames have been acquired, the method 100 performs, at step 116, a fit on the sequence of N iso-time frames. Here, the method 100 may perform a numerical (e.g., least-squares) fit on the sequence of N iso-time frames for every pixel captured by the imaging device 12 using, for example: a low order polynomial function; a straight line ($1^{st}$ order polynomial) function; or another function. In some instances, the computing device 18 may discard, delete, not utilize, or ignore the one or more of the initially captured iso-time frames from the numerical (e.g., least-squares) fit analysis in order to establish a stable temperature range. Thereafter, the method 100 may display the resulting set of fit functions on the display 20 of the computing device 18 as an image at a specified time by instantiating the fit function for every pixel at that time. At step 118, the method 100 analyzes the set of fit functions to determine whether or not a discontinuity is detected. In some examples, the computing device 18 outputs a notification indicating whether or not the subsurface discontinuity is detected based on the analysis of the set of fit functions. The notification may be displayed on the display 20 of the computing device as a visual graphic text. Additionally or alternatively, the notification may be audibly output from a speaker in communication with the computing device. The notification may also be stored and/or sent to another computing device. In some implementations, the computing device 18 generates a report indicating that a subsurface discontinuity is detected, and providing information about the discontinuity such as the type of discontinuity (one of subsurface features $S_{2C}$, $S_{2CW}$, $S_D$) and the location/depth of the subsurface discontinuity on the workpiece. After the resulting set of fit functions are analyzed at step 118, the method 100 then ends at step 120.

Referring to the method 200 of FIG. 4, after capturing the subsequent (e.g., "$n^{th}$") iso-time frame at step 214, the method 200 advances to step 216 to perform a set of one or more fit functions on the sequence of iso-time frames captured up to the current $n^{th}$ iso-time frame, and subsequent analysis of set of fit functions at step 218. Steps 216, 218 are substantially to steps 116, 118 described above except that the set of fit functions and subsequent analysis are performed after each iso-time frame is captured. That is, by contrast to the method 100 of FIG. 3 which requires the full sequence of N iso-time frames to be captured before performing the fit and subsequent analysis to determine whether the subsurface discontinuity is detected, the method of FIG. 4 performs the set of fit functions and subsequent analysis to detect discontinuity each time a new nth iso-time frame is captured. In some examples, the method 200 subtracts the pre-flash frames when performing the set of one or more fit functions on the sequence of iso-time frames. At decision step 219, the method 200 determines whether or not a subsurface discontinuity (e.g., any one of subsurface features $S_{2C}$, $S_{2CW}$, $S_D$) is detected based on the analysis performed at step 218. When a subsurface discontinuity is detected (i.e., decision step 219 is "YES"), the method ends at step 220. Here, the computing device 18 may output a notification indicating detection of the subsurface discontinuity and/or generate the report indicating information about the discontinuity such as the type of discontinuity (one of subsurface features $S_{2C}$, $S_{2CW}$, $S_D$) and the location/depth of the subsurface discontinuity on the workpiece.

When a subsurface discontinuity is not detected after capturing the $n^{th}$ iso-time frame (i.e., decision step 219 is "NO"), the method 200 reverts to decision step 215 that determines whether or not the current counter value n is equal to the predetermined counter limit "N". The counter limit N may be configurable and set to a value based on properties (e.g., material and/or thickness) of the workpiece S and/or one or more subsurface discontinuities of interest. Accordingly, when the current counter value n is not equal to the counter limit N (i.e., decision step 215 is "NO"), the method 200 reverts back to step 208 and increments the counter value and repeats steps 210-219. Conversely, once the counter value n is equal to the counter limit N (i.e., decision step 215 is "YES"), the method 200 ends at step 220 without detecting the subsurface discontinuity. Here, the computing device 18 may output a notification indicating that no subsurface discontinuity is detected after applying the sequence of N excitation pulses $P_1$-$P_N$.

Accordingly, the first "ON cycle" of heating the workpiece S (see, e.g., step 104, 204) will cause the temperature of the outer surface $S_S$ of the workpiece S to rise, reaching a maximum at the end of the heating cycle and thereafter cooling during the following "OFF cycle". In subsequent heating cycles of the workpiece S, the output of the heat associated with the excitation pulse $P_n$ may be reduced (at, e.g., step 110, 210) by adjusting either (or a combination of): (1) the amplitude A of the excitation pulse $P_n$; and/or (2) the duration D of the excitation pulse $P_n$ so that the temperature increase of the outer surface $S_S$ of the workpiece S is small relative to (i) a sequence of excitation pulses that would otherwise be identical to the first excitation pulse $P_1$, or (ii) a single excitation pulse having energy equivalent to the sum of pulses contained in a sequence of excitation pulses defined by:

$$P_E = \Sigma(A_n)(P_1)(D_n)$$

where $A_n$ is the amplitude A of pulse $P_n$ with respect to $P_1$, $P_1$ is the first pulse and $D_n$ is the duration of pulse $P_n$ with respect to $P_0$.

The amplitude A, duration D, and/or spacing W of each excitation pulse $P_n$ may be pre-computed, programmed in advance, or determined (manually by, for example, a human operator, or, alternatively, automatically utilizing artificial intelligence associated with the computing device 18) in real time as the inspection of the workpiece 10 is conducted by the system 10. In the predetermined scenario, depending on the type of the workpiece S (e.g., a monolithic solid, or a multilayer member), a function that is essentially the reciprocal of the average surface temperature increase over time of an infinitely thick workpiece S is used in order to reduce the excitation amplitude A of the pulse $P_n$ by reducing either in intensity of the source or the duration. In some examples, the function may be adjusted for more complex multilayer workpiece S. For real-time adjustment of excitation amplitude A of the pulse $P_n$, the (spatial) average temperature of the outer surface $S_S$ of the workpiece S may be measured at a particular time after the beginning of the "OFF cycle".

The temperature associated with the emitted radiation R from the outer surface $S_S$ of the workpiece S may be measured by the computing device 18 by either: (1) calculating the average temperature of the outer surface $S_S$ of the workpiece S according to the image captured by the imaging device 12 at the designated time; or (2) by using an external device (e.g., a single point IR thermometer (not shown) or a $2^{nd}$ IR camera that has been calibrated for absolute temperature measurement (not shown)). Information from the image captured by the imaging device 12 or an external device (not shown) may be provided to the computing device 18 in a negative loop so that, for example, the excitation amplitude A of the excitation pulse $P_n$ is adjusted (e.g., at steps 110, 220 of FIGS. 3 and 4) in order to maintain a steady temperature at the time associated with the $n^{th}$ iso-time image associated with the emitted radiation R from the outer surface $S_S$ of the workpiece S.

The modulation of the excitation pulse P may be, for example: a square waveform; a sinusoidal waveform; or another waveform. The modulation of the waveform may be performed by one or a combination of several different mechanisms, procedures, or methodologies such as, for example: (1) direct intensity modulation of the source (i.e., increasing or decreasing the intensity of the source), which may involve a low level "simmer" condition during the "OFF cycle" to minimize lag in the onset and consistent output through the entire "ON period"; (2) adjustment of the "ON period" (e.g., duration adjustment) that may be accomplished by, for example, direct control of the source, opening of the shutter 16, closing of the shutter 16, or both; and (3) adjustment of the duration of the "OFF period" (e.g. adjustment of spacing W). Either identical or adjusted excitation pulses $P_n$ may be applied at a varying time interval after a previously applied excitation pulse $P_{n-1}$.

Figure 5:
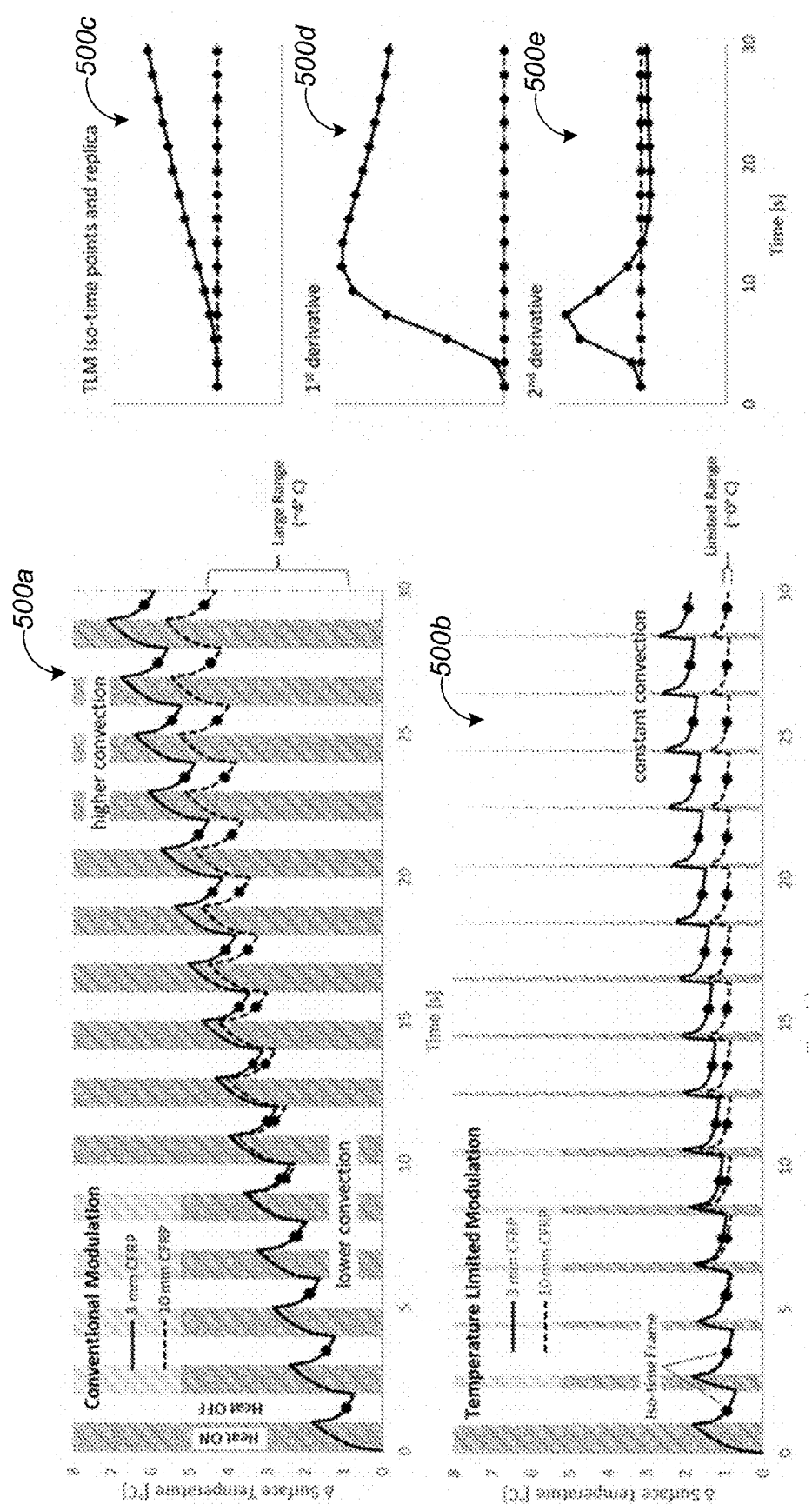
FIG. 5 is a comparison of modulated (top left) and temperature-limited modulation (bottom left) results for 3 mm thick and 10 mm thick carbon fiber panels, in accordance with the principals of the present disclosure. The $1^{st}$ and $2^{nd}$ derivatives (right) of the temperature-limited modulation signal enhance the effect of the 3 mm back wall.

FIG. 5 shows an example plots 500a, 500b depicting average surface temperature of 3 mm and 10 mm thick workpieces when heating is applied by conventional modulation (plot 500a) and by temperature-limited modulation (TLM) (plot 500b). TLM refers to the techniques described above with reference to FIGS. 3 and 4. Each plot 500a, 500b shows ON and OFF Cycles periods in which the surface temperature of the workpiece increases and decreases, respectively. Plot 500a shows that applying conventional modulation results in the average surface temperature gradually increasing over time for both of the workpieces over time due to increasing convection. The temperature range is about 4 degrees Celsius. On the other hand, plot 500b shows that applying TLM maintains a stable temperature over the same time period with a relatively constant convection. Iso-time frames are captured during the Off-Cycles. Plot 500c shows a fit of iso-time frames collected when applying the TLM to both workpieces, while plots 500d, 500e depict respective ones of first and second derivatives. Notably, plot 500b also shows that the duration of the "ON Cycles" and spacing between adjacent excitation pulses is variable in order to maintain the stable temperature with constant convection.

Figure 6A:
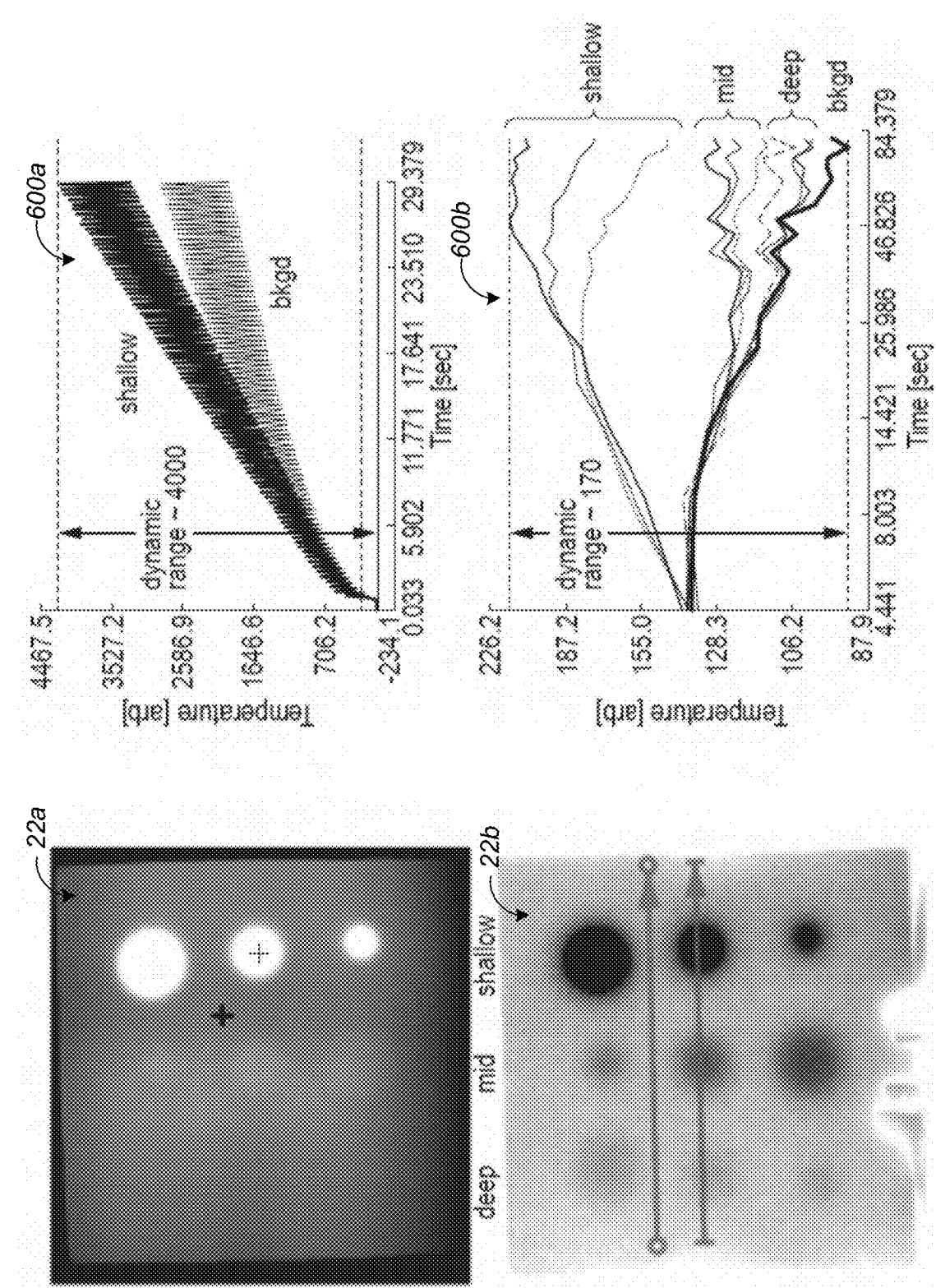
FIGS. 6A-6C illustrate experimental results for temperature-limited modulation applied to a workpiece with back-drilled holes of varying diameters.

FIG. 6A shows example plots 600a, 600b depicting surface temperature of a workpiece as a function of time when heating is applied by conventional modulation (plot 600a) and by TLM (600b). The example workpiece includes subsurface three cavities/voids $S_{2C}$ of varying size at each of a shallow-depth, mid-depth, and deep-depth of the workpiece in which the deep-depth cavities/voids $S_{2C}$ are located furthers from the outer surface of the workpiece that opposes the heat source. Image 22a depicts thermal-imaging of the workpiece when conventional modulation heating is applied. Here, the mid-depth cavities/voids are barely noticeable and the deep-depth cavities/voids are not detected. The corresponding plot 600a associated with the conventional modulation shows a background temperature response profile that the outer surface temperature of the workpiece is expected to follow if no subsurface discontinuities were present and a shallow temperature response profile depicting the temperature response of the outer surface temperature due to the presence of the shallow depth cavities/voids. Notably, due to increases in convection inherent to heating by conventional modulation, and depicted by the large range of temperatures (e.g., about 4,000), the mid- and deep-depth cavities voids are effectively canceled out in the corresponding image 22a.

Image 22b depicts the thermal imaging of the workpiece when TLM heating is applied. Since TLM maintains a substantially constant convection over time (e.g., see plot 500b of FIG. 5), the subsurface cavities/voids $S_{2C}$ of varying size at each of the shallow-depth, mid-depth, and deep-depth are detected. The corresponding plot 600b associated with the TLM shows a background temperature response profile that the outer surface temperature of the workpiece is expected to follow if no subsurface discontinuities were present. For each subsurface cavity/void $S_{2C}$ of varying size located at each of the different depths, a corresponding temperature response profile is depicted in which the break-away point from the background temperature response profile indicates the time at which the defect is detected. Using properties of the workpiece such as material and thickness, the location/depth of each cavity/void can be determined based on the time at which the corresponding temperature response profile breaks away from the background temperature response profile. For instance, the temperature responses for the cavity/voids at the shallow-depth breakaway from the background temperature response earlier than the mid- and deep-depth cavity/voids.

Figure 6B:
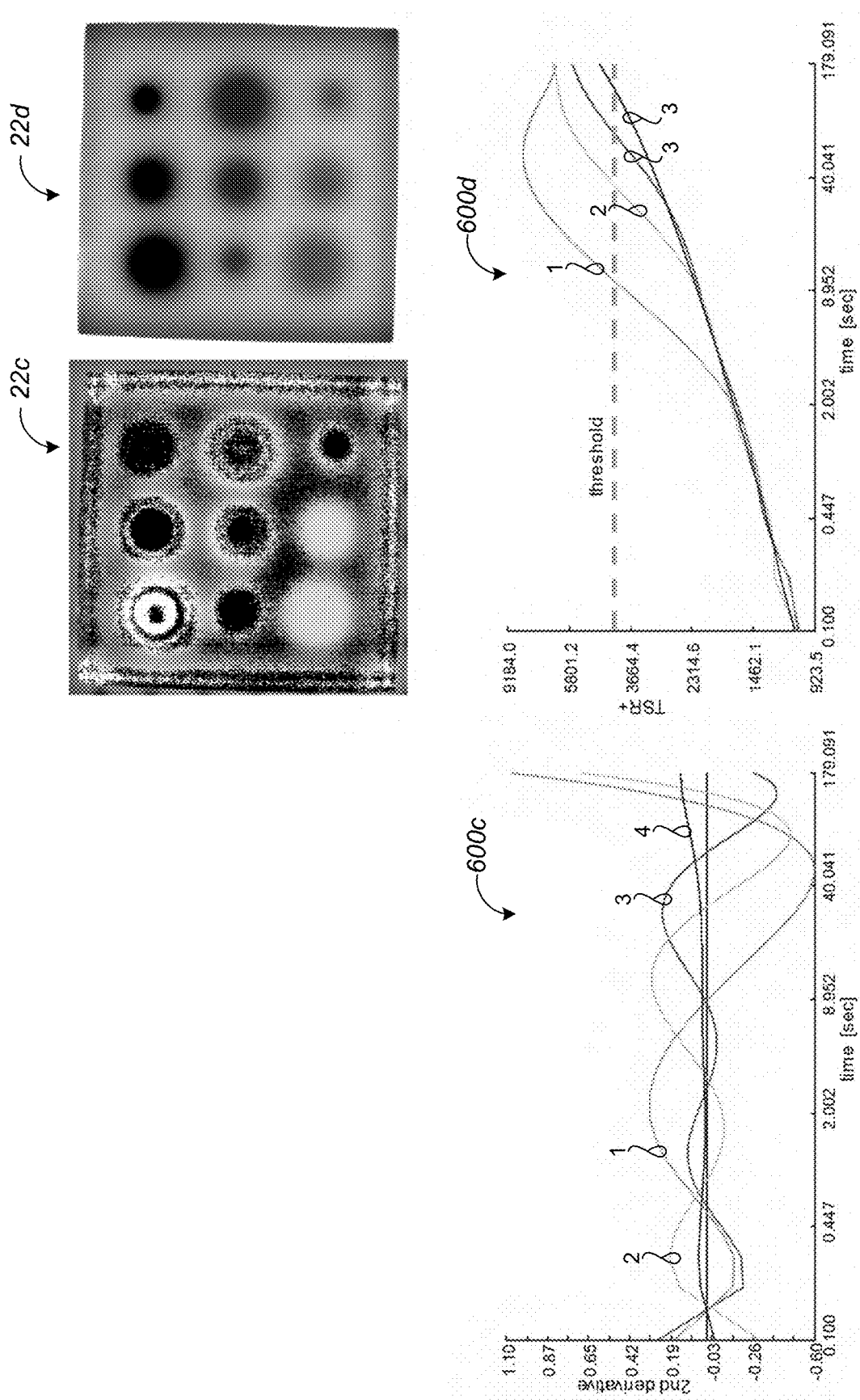

FIG. 6B shows example plots 600c, 600d depicting surface temperature of a workpiece as a function of time when a sequence of iso-time frame images is reduced by a second derivative of time history (plot 600c) and when Thermographic Signal Reconstruction (TSR+) is applied to a rotated time history of the sequence of iso-time frame images (600d). Image 22c shows a second derivative max time image and image 22d shows a TSR+ rotated image each depicting cavities/voids present in a workpiece at depths of 0.070", 0.120", 0.200", and 0.500". In each of plots 600c, 600d, profile lines 1, 2, 3, and 4 depict temperature response of the cavities/voids in the workpiece at the depths of 0.070", 0.120", 0.200", and 0.500", respectively. Plot 600c shows that the reduction of the $2^{nd}$ derivative time history is complicated by the occurrence of multiple peaks. Plot 600d shows that the reduction of the TSR+"rotated" time history is simple and retains a smooth character of the polynomial fit. Times t1, t2, t3, t4 depict when respective ones of the cavities/voides at depths 0.070", 0.120", 0.200", and 0.500", respectively, satisfy a threshold for detecting a subsurface cavity/void.

Figure 6C:
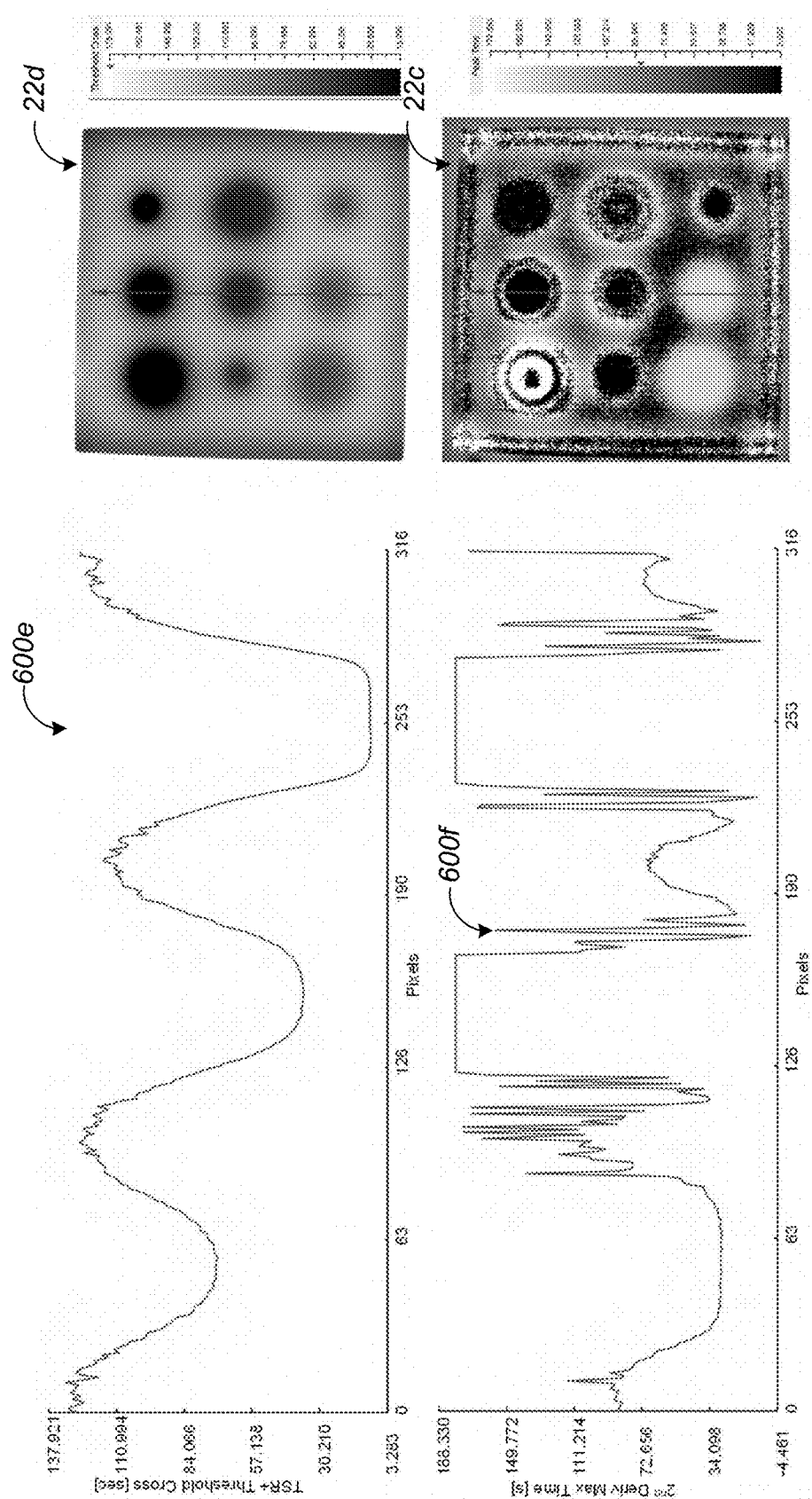

FIG. 6C shows example plots 600e, 600f depicting reductions displaying a time at which a maximum temperature of each pixel occurs in a sequence of iso-time frame images reduced by a second derivative of time history (plot 600f) and reduced by TSR+ is applied to a rotated time history of the sequence of iso-time frame images (600e). Image 22c shows a second derivative max time image and image 22d shows a TSR+ rotated image each depicting cavities/voids present in a workpiece at depths of 0.070", 0.120", 0.200", and 0.500". Plot 600e shows that reduction by TSR+ clearly displays the presence of both shallow and deep subsurface cavities compared to plot 600f.

In some implementations, during each "OFF cycle", data related to a captured frame of the imaging device 12 related to the temperature associated with the emitted radiation R from the outer surface $S_S$ of the workpiece S at an iso-time relative to the pulse $P_n$, or an average of consecutive captured frames, at a designated time after the beginning of the "OFF cycle" is provided to the computing device 18. The imaging device 12 may collect the data either continuously, or, for example, only at the designated iso-times (see, e.g., plots 500a, 500b of FIG. 5). These iso-times can pre-designated or triggered by the computing device 18. After a full sequence of frames have been acquired by the computing device 18, a numerical (e.g., least squares) fit of the iso-time frames is performed for every pixel of the captured frames, using, for example: a low order polynomial function; a straight line ($1^{st}$ order polynomial) function; or another function. In some examples, the first few iso-time frames that establishes the stable temperature range may be eliminated from the fit. The resulting set of fit functions may be displayed on the display 20 of the computing device 18 as an image at a specified time by instantiating the fit function for every pixel at that time.

For enhanced detection of one or more subsurface features $S_{2C}$, $S_{2CW}$, $S_D$ of the workpiece S, a first time derivative or a second time derivative of each pixel fit function may be calculated and displayed on the display 20 of the computing device 18 at a particular time (see, e.g., plots 500*d*, 500*e* of FIG. 5 and plots 600*a*, 600*b* of FIG. 6A). The sequence may be reduced to a single image showing an attribute of the sequence or its derivatives for every pixel. Attributes may include, but are not limited to: (1) a maximum or minimum first derivative amplitude; (2) a time at which a maximum or minimum first derivative amplitude occurs; (3) a temperature associated with the emitted radiation R from the outer surface $S_S$ of the workpiece S at a time when a maximum or minimum first derivative amplitude occurs; (4) a maximum or minimum second derivative amplitude; (5) a time at which a maximum or minimum second derivative amplitude occurs; (6) a surface temperature at time when a maximum or minimum second derivative amplitude occurs; (7) a time at which the first derivative crosses a specified threshold in the positive or negative direction; (8) a surface temperature at a time of the first derivative threshold crossing; (9) a time at which the second derivative crosses a specified threshold in the positive or negative direction; (10) a surface temperature at a time of the second derivative threshold crossing; (11) a derivative or function value falling outside of a specified range; (12) a deviation from a stored result or precomputed model; or (13) a deviation from a prescribed function (e.g., a straight line function).

In view of the above-described exemplary implementations, an entire data set may be acquired and then the fit of iso-time points may be performed for every pixel in the frame that is captured by the imaging device 12 so that the result can be viewed on a display (e.g., the display 20 of the computing device 18). Alternatively, the latest set of iso-time points can be added to previously collected iso-time points, and then fit, operated on mathematically, and displayed (e.g., the display 20 of the computing device 18) after each "OFF cycle" so that the operator may be able to view an image (e.g., the display 20 of the computing device 18) that is updated with each cycle; in this mode, the computing device 18 of the system 10 could be programmed to warn (e.g., by displaying a warning on the display 20 of the computing device 18) the user if, for example, the time derivative of a pixel, or a cluster of pixels reaches a value outside of a specified range. In this mode, the acquisition of data by the computing device 18 from the imaging device 12 could be automatically terminated if a preset condition consistent with a subsurface feature $S_{2C}$, $S_{2CW}$, $S_D$ of the workpiece S was met.

The results obtained from the iso-time replica and its derivatives are sensitive to deeper subsurface features $S_{2C}$, $S_{2CW}$, $S_D$ of the workpiece S, and less sensitive to near-surface features. However, each cooling cycle signal is a monotonically decreasing function that contains information about near surface features that can be significantly enhanced using various systems and methods. All of the cycle responses represent thermal diffusion through same near-surface layer, but with reduced signal amplitude as the amplitude of the excitation decreases over the course of the acquisition, so that this enhancement process could be applied to any (or all) cycles. For an individual cycle, the logarithm of the amplitude of all points in the cooling (OFF) phase are fit, using a least squares or other numerical approximation, with a polynomial that is a function of the logarithm of time where t=0 is the midpoint of the duration of the previous heating pulse. Prior to the fit, the terminal temperature of the previous sequence may be subtracted from the current cooling sequence. The resulting image of the fit polynomial or its derivatives and attributes may be interrogated to reveal near surface defects, interfaces, and/or anomalies.

As described above, the present disclosure is sensitive to internal changes in the workpiece S (see, e.g. voids $S_{2C}$, $S_{2CW}$ or delamination $S_D$) that affect heat conduction from the outer surface $S_S$ of the workpiece S into the volume of the workpiece S. It assumes that the workpiece S is a reasonable medium for heat conduction and not an insulator (e.g., air, a foam material, or a fiberglass honeycomb material that may be typically found in aerospace sandwich structures between composite or aluminum skins). In such sandwich structures, thermography methods are effective in examining: (1) the skin up to the core; and (2) the skin-to-core bond, but, however not beyond the bond into the core material, since the applied heat is either insufficient to penetrate the core (e.g., flash or step heating), or raises the surface temperature so high that convection and out-of-range temperatures frustrate attempts to detect anomalies $S_{2C}$, $S_{2CW}$, $S_D$ in the core of the workpiece S. These types of structures are typically inspected using a different type of thermography to detect trapped water $S_{2CW}$ or ice $S_{2CW}$ in the core of the workpiece S where, for example, a navigational component (e.g., a stabilizer, a rudder, or the like) is detached from, for example, an aircraft and placed in either an oven or freezer for an extended period of time (e.g., 30 minutes) in order to raise the temperature of the entire part substantially above (or below) the ambient temperature.

Alternatively, heating excitation may be accomplished by placing, for example, a heat blanket in contact with, for example, the navigational component, thereby leaving, for example the entire aircraft or a part of the aircraft in bright sunlight, or, alternatively, examining the aircraft immediately after landing, when water $S_{2CW}$ that has entered a void $S_{2C}$ of the navigational component has been frozen therein during flight. Once the temperature has been raised or lowered sufficiently, the navigational component is exposed to the ambient surroundings, where it returns to equilibrium by convective energy exchange with a surrounding fluid (e.g., air). Concentrations of water $S_{2CW}$ in the navigational component will remain hot (or cold) while the rest of the navigational component equilibrates and nearby surface areas will eventually appear as hot or cold indications in the image that is captured by the imaging device 12. The process is time consuming, particularly so when disassembly of the navigational component from the aircraft is involved.

Using the temperature-limited modulation (TLM) methods 100, 200 described above at FIGS. 3 and 4, the navigational component can continue to be heated in a limited temperature range after heat deposited at the surface reaches the skin to core interface so that over time the core becomes heated despite its low thermal conductivity. Regions of anomalous heat capacity (e.g., water $S_{2CW}$, ice $S_{2CW}$, or a void $S_{2C}$ in foam) will absorb heat differently than surrounding regions. The differences, although small, will appear in the derivatives of the iso-time images. These methods 100, 200 may also be utilized to detect, for example, disbonds $S_D$ on the far side on composite sandwich structures with fiberglass honeycomb using either the entire iso-time sequence or only the portion of the sequence beginning after heat from the outer surface $S_S$ reaches the skin-core interface.

The present disclosure allows for the detection of deeper discontinuities (e.g., the one or more subsurface features $S_{2C}$, $S_{2CW}$, $S_D$ of the workpiece S, or the layer boundary between $S_1$ and $S_2$). Using either of the methodologies 100, 200, the data of images captured by the imaging device 12 that is related to the temperature associated with the emitted radiation R from the outer surface $S_S$ of the workpiece S can be rearranged to provide several useful subsets such as, for example: (1) a static image (or average of consecutive images) of the workpiece S prior to the initial excitation; (2) a sequence of iso-time images (or several sequences of different iso-times); (3) images obtained from the iso-time (excitation "OFF cycle") sequences (e.g., specific times in the processed sequences or images of attribute values, such as, for example, derivative maxima, minima or integrals); (4) images obtained during the excitation "ON cycle;" and (5) images obtained during the excitation "OFF cycle" with shutters 16a open.

Furthermore, either of the methodologies 100, 200 may also be utilized with, for example, a robotic system or a projection thermography system as described in commonly-owned U.S. Pat. No. 9,250,134, to inspect an area of a workpiece S that is much larger than a field of view of the imaging device 12 in this exemplary implementation, either of the methodologies 100, 200 can be utilized to exploit the fact that the imaging device 12 may be only active for the capture of the iso-time frame of the "OFF cycle". For the remainder of the "OFF cycle", the imaging device 12 and one or more heating devices 14 may be moved or rearranged to a different position or location of the workpiece S in order to perform an additional heating/acquisition cycle and then return to the original position to perform the next heating/acquisition cycle. The net result is a collection of iso-time sequences that comprise a map of an area that is the sum of the interrogated areas on the workpiece S. When employing either of the methodologies 100, 200, the temperature of the outer surface $S_S$ of the workpiece S may be held in a narrow range above the noise and background so that convection is minimal and constant over an entire duration of the inspection of the workpiece S.

By applying either of the methodologies 100, 200, the modulation frequency is not related to the penetration depth. The inspection may be extremely long without adverse effects or be programmed to operate automatically in real-time and terminate if a discontinuity (e.g., the one or more subsurface features $S_{2C}$, $S_{2CW}$, $S_D$ of the workpiece S, or the layer boundary between $S_1$ and $S_2$) is detected. Moreover, the convection is minimal and constant over the entire acquisition.

By applying either of the methodologies 100, 200, the modulation acts as a carrier for the response to each heating excitation pulse P during the "OFF cycle" excitation period. The frequency of the carrier is not related to the penetration depth. The individual responses represent the near-surface state of the workpiece S and do not substantially change over the course of the inspection. However, the temperature offset between subsequent cycles will be affected if a subsurface anomaly (e.g., the one or more subsurface features $S_{2C}$, $S_{2CW}$, $S_D$ of the workpiece S) interferes with heat transfer into the bulk.

FIG. 7 is a schematic view of an example computing device 18 that may be used to implement the systems and methods described in this document. The computing device 18 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 18 includes a processor $18_1$ (also referred to as data processing hardware), memory $18_2$ (also referred to as memory hardware), a storage device $18_3$, a high-speed interface/controller $18_4$ connecting to the memory $18_2$ and high-speed expansion ports $18_5$, and a low speed interface/controller $18_6$ connecting to a low speed bus $18_7$ and a storage device $18_3$. Each of the components $18_1$, $18_2$, $18_3$, $18_4$, $18_5$, and $18_6$, are interconnected using various busses, and may be mounted on a common motherboard or in other manners as appropriate. The processor $18_1$ can process instructions for execution within the computing device 18, including instructions stored in the memory $18_2$ or on the storage device $18_3$ to display graphical information for a graphical user interface (GUI) on an external input/output device, such as display $18_8$ (or the display 20 at FIG. 1) coupled to high speed interface $18_4$. In other implementations, multiple processors and/or multiple buses may be used, as appropriate, along with multiple memories and types of memory. Also, multiple computing devices 18 may be connected, with each device providing portions of the necessary operations (e.g., as a server bank, a group of blade servers, or a multi-processor system).

The memory $18_2$ stores information non-transitorily within the computing device 18. The memory $18_2$ may be a computer-readable medium, a volatile memory unit(s), or non-volatile memory unit(s). The non-transitory memory $18_2$ may be physical devices used to store programs (e.g., sequences of instructions) or data (e.g., program state information) on a temporary or permanent basis for use by the computing device 18. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device $18_3$ is capable of providing mass storage for the computing device 18. In some implementations, the storage device $18_3$ is a computer-readable medium. In various different implementations, the storage device $18_3$ may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory $18_2$, the storage device $18_3$, or memory on processor $18_1$.

The high speed controller $18_4$ manages bandwidth-intensive operations for the computing device 18, while the low speed controller $18_6$ manages lower bandwidth-intensive operations. Such allocation of duties is exemplary only. In some implementations, the high-speed controller $18_4$ is coupled to the memory $18_2$, the display $18_8$ (e.g., through a graphics processor or accelerator), and to the high-speed expansion ports $18_5$, which may accept various expansion cards (not shown). In some implementations, the low-speed controller $18_6$ is coupled to the storage device $18_3$ and a low-speed expansion port $18_9$. The low-speed expansion port $18_9$, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 18 may be implemented in a number of different forms, as shown in the figure. For example, it may be implemented as a standard server 18a or multiple times in a group of such servers 18a, as a laptop computer 18b, or as part of a rack server system 18c.

Implementations herein enable reducing a thermographic data sequence captured by an imaging device to a single image for improving detection of subsurface discontinuities. When working with active thermography data, it is often useful to reduce the entire surface temperature response measured by the IR camera to a single image, or a few images that represent the data in a manner that allows quantitative comparison or classification of results, or measurement of physical properties of the test sample. Such reduction is particularly useful for automated data processing or defect recognition. One approach to data reduction employs the Thermographic Signal Reconstruction (TSR) method, in which a noise-free replica of each pixel time history is created by fitting the original data on a double logarithmic scale with a polynomial function. Images that include instantaneous time derivatives of the replicas may be displayed (e.g., on the display 20 of FIG. 1) as discrete "time slice" images, or as a continuous movie, that suppress relatively static background pixels, and enhance deviations from normal cooling behavior associated with subsurface defects or anomalies.

Reduction of TSR data for quantitative analysis or automation can be accomplished by creating maps of specific attributes of the derivative signal for each pixel, e.g. the maximum amplitude of the $2^{nd}$ derivative, or the time at which the maximum amplitude occurs. While such derivative-based schemes are widely used for numerous applications in flash, step or modulated thermography, they are subject to certain limitations. For instance, the depth range of defects is limited (as depicted by plot 600a and corresponding image 22a of FIG. 6A when conventional modulation heating is applied). In this scenario, the imaging device (e.g., IR camera) acquires data at a fixed frame rate but fitting and analysis is performed on a logarithmic scale, appropriate for thermal diffusion. As a result, near surface features are likely to be under-sampled, while deeper defects are oversampled. The fidelity of the derivative and subsequent measurements made from it will vary with the sampling. Often, a temporal sampling rate of widely used IR cameras is insufficient to support the creation of useful derivatives of near-surface features, so that quantitative analysis may be limited to deeper features. Other limitations of derivative-based schemes used in conventional heating techniques revolve around time histories of discrete subsurface defects or features of interest. Here, the time histories need to be sufficiently different from one another between the defect areas and normal, defect-free areas by referencing oscillations about the mean that occur in the normal fitting process are amplified by differentiation process, to the extent that their amplitudes may be comparable to those of the derivative signal peaks of interest. As a result, although excellent fits of transient thermography signals obtain using polynomial fitting, the derivatives of the fits may yield misleading or incorrect data in some circumstances. Moreover, examples of thermographic signals often illustrate response due to strong interfaces, e.g. a void in the form of a flat bottom hole or an insulated wall. In such cases, there is a significant change in signal, viewed on a double logarithmic scale that indicates a break from normal diffusion behavior at a particular depth. This type of time-history represents a wide range of applications and is well-suited to polynomial fitting using a relatively low order function (e.g. order ~8). However, more subtle features, e.g. where an inclusion or buried layer comprises a material with thermal properties less distinct that those of the host or adjacent material than air or a vacuum may present a time-history signal that has no apparent features and resembles a straight line. In such a signal, the polynomial oscillations about the mean may be on a scale comparable to the actual signal variation due to changes in the sample. The oscillations will be exaggerated by the derivatives, leading to incorrect or misleading results.

The exemplary methods for reduction of active thermography data into a single image is applied address the aforementioned limitations discussed above when thermography data is collected from the TLM heating techniques disclosed herein, as well as thermography data collected from pulsed, stepped, or conventionally modulated heating techniques. The fitting and analysis performed at steps 116, 216, 118, 218 of methods 100, 200 of FIGS. 3 and 4 exploit the fact that although the polynomial fits of thermographic data sequences can be extremely good, their time derivatives may suffer from the limitations listed above. By performing the polynomial fit without calculating the time derivative of each time-history replica, the noise-free replica may be simply multiplied by the $n^{th}$ power of elapsed time (relative to the midpoint of the excitation event). The net effect of the multiplication acts as a "rotation" of the replica time history. The multiplication parameter n can be selected so that a single amplitude value (horizontal line) intercepts every time history in the data set. The time at which the intersection of the line and each pixel time history intersects can the recorded and displayed as a single image that represents the relative depth of each pixel (absolute depth can be calculated using a reference standard), thereby reducing the entire data set to a single image.

FIG. 7 shows a plot 700 of surface temperature response as a function of time when TLM applied to a carbon fiber workpiece panel that is 100 mm thick and includes a subsurface flat bottom hole (FTB) occurring at a depth of 7 mm and having a diameter of 14 mm. Temperature response profile 710 indicates an expected temperature response of a normal carbon fiber workpiece panel of 100 mm thickness if no defects were present. Temperature response profile 720 indicates the temperature response affected by the FBH of 14 mm diameter that occurs at the depth of 7 mm. Points 712, 722 indicate corresponding times when iso-time frames are captured during each OFF Cycle. As described above with reference to plot 500b of FIG. 5, the TLM limits the iso-time temperature of the sample to a small range, influences convection is constant over the entire acquisition time, lower energy input for TLM compared to conventional modulation reduces convection, and signal to noise is relatively constant over the entire acquisition.

Figure 8:
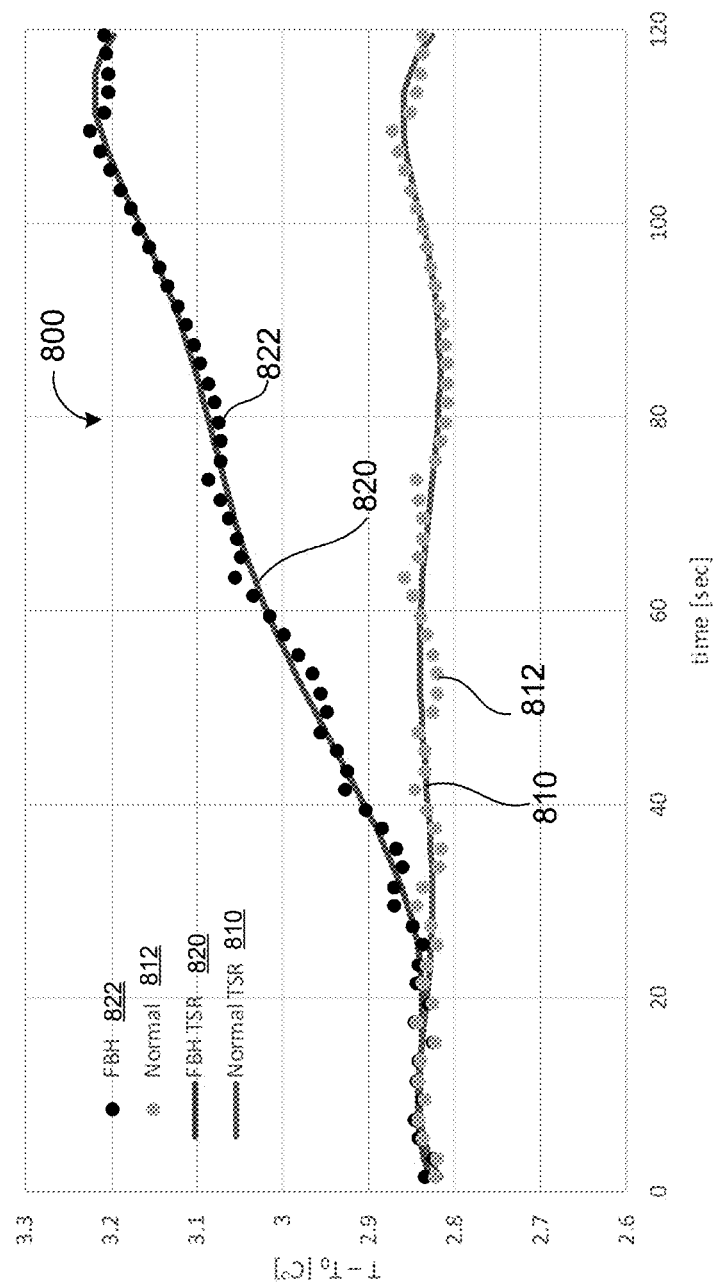
FIG. 8 illustrates a plot depicting fits of iso-time frame sequences of the normal workpiece and the workpiece with the flat black whole of FIG. 7 when the temperature-limited modulation is applied.

FIG. 8 shows a plot 800 of TSR fitting on the sequence of iso-time frames captured by the TLM heating applied to the carbon fiber workpiece of FIG. 7. Fit line 810 depicts a corresponding sixth order polynomial fit of the sequence of iso-time frames 812 captured for the normal carbon fiber workpiece panel when no defects are present. Fit line 820 depict a corresponding sixth order polynomial fit of the sequence of iso-time frames 822 captured for the carbon fiber workpiece panel having the FBH of 14 mm diameter that occurs at the depth of 7 mm. Here, the polynomial fitting of the iso-time sequence (i.e., using TSR) creates a smooth function that includes small variations due to discrete heat pulses and polynomial oscillations about the mean.

Figure 9:
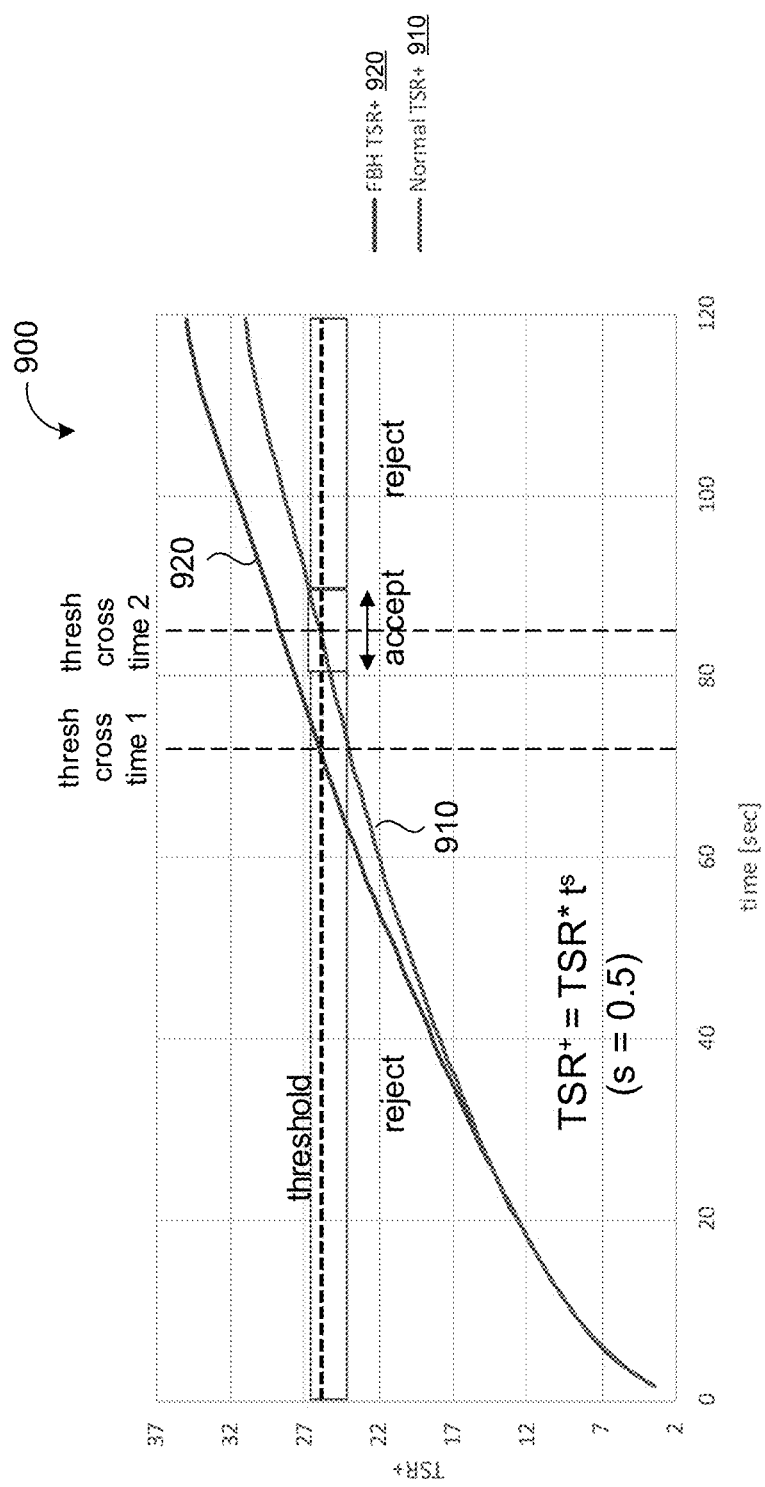
FIG. 9 illustrates a plot depicting a reduction of the sequence of iso-time frames to a single image by using thermographic signal reconstruction.

Before performing the multiplication, it may be advantageous to perform an additional step to remove signal offsets due to non-uniform heating, poor camera calibration, or emissivity variations on the sample surface. In this step, an early frame, acquired during the time regime before variations due to subsurface features appear in the signal, is selected. The mean and standard deviation of all pixels in this frame (or a designated subset of the frame) is calculated, and a constant is added to each pixel time history so that all pixels have identical values in the designated frame. Subsequent multiplication is performed on this offset adjusted data. In addition to addressing the issues listed previously, there are additional advantages to performing this "rotation" operation compared to the derivative operation (the operation is not an actual rotation, but it does appear to be so in the plot of the time history). For instance, the "rotated" time history is typically monotonic, and can be performed without human assistance, while the derivatives may one contain or more peaks that require interpretation. Moreover, the rotated" time history maintains its tight fit over the entire time sequence, while the derivatives may become unstable asymptotically, causing artificial peak values to occur. Thus, the rotated history is useful over the entire signal range, while the derivative is not FIG. 9 shows a plot 900 depicting a reduction of the sequence of iso-time frames to a single image by using TSR. The y-axis denotes a TSR+ signal and the x-axis denotes time. Response line 910 depicts a TSR+ signal of polyfit iso-time sequence for the normal workpiece with no defects and response line 920 depicts a TSR signal of polyfit iso-time sequence for the workpiece having the FBH. The TSR+ signals 910, 920 indicate the polyfit iso-time sequence after performing the aforementioned "rotation" operation in order to remove signal offsets. The plot 900 shows that the entire sequence of is-time frames can be reduced to a single image by recording a time at which the TSR+ signals 910, 920 cross a designated threshold. For instance, the TSR+ signal 910 for the normal workpiece crosses the threshold at time 2 within an accepatce range, while the TSR+ signal 920 for the workpiece having the FBH crosses the threshold earlier at time 1 within a reject range. As a result, the computing device 18 of FIG. 1 may issue the notification indicating that the FBH was detected in response to the TSR+ signal 920 crossing the threshold at time 1 indicative of the reject range. Thus, the process may be automated by designating an "acceptable" threshold crossing time, and rejecting samples if a significant number of pixels fall outside that range.

Figure 10:
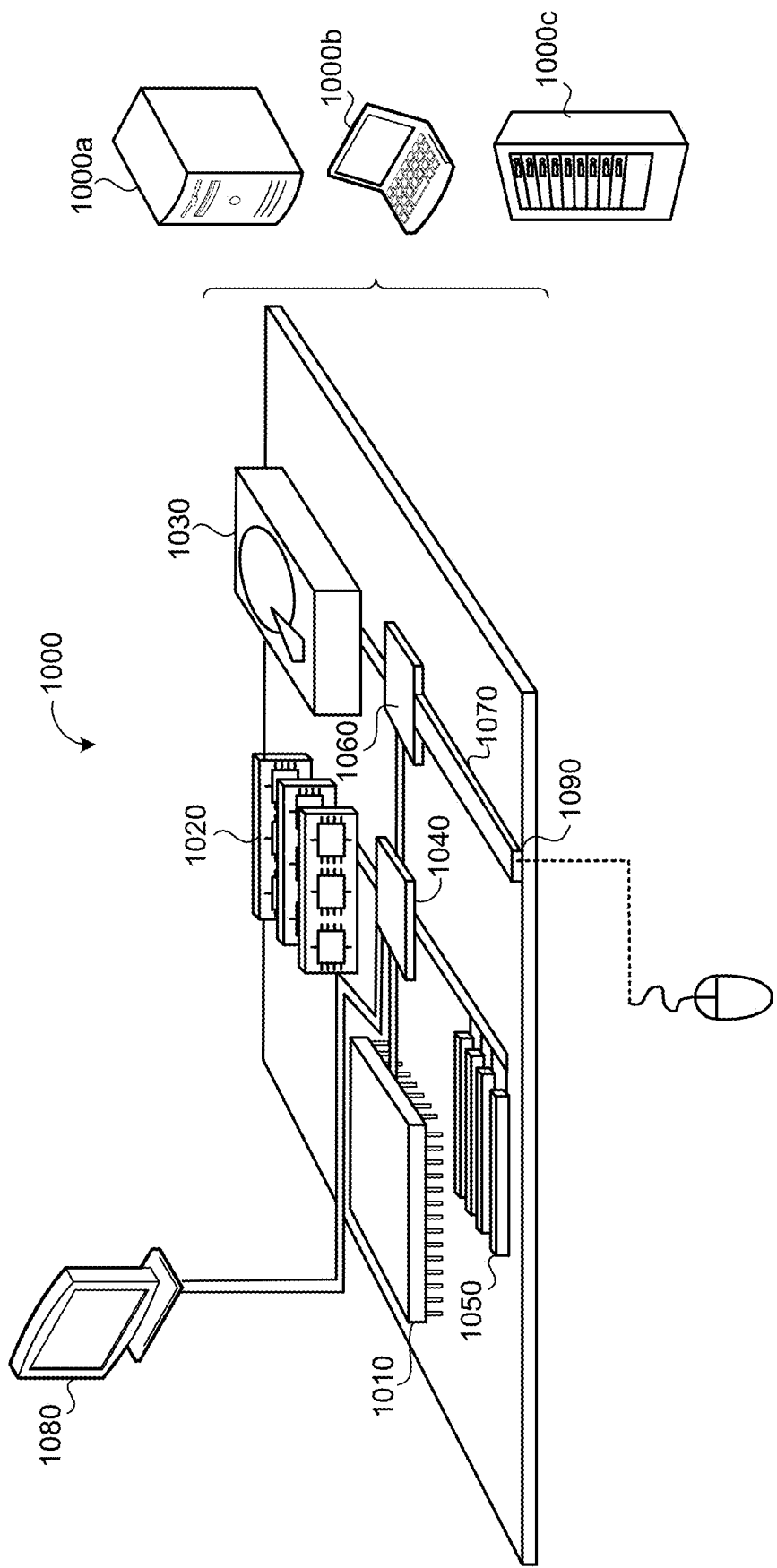
FIG. 10 is a schematic view of an example computing device that may be used to implement the systems and methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when implemented on data processing hardware causes the data processing hardware to perform operations for a method of performing non-destructive testing using active thermography, the operations comprising:
   applying, using a thermal excitation device, a first excitation pulse to a workpiece;
   capturing, using an imaging device, a first iso-time frame of the workpiece;
   determining a target temperature range for the workpiece; and
   for each respective intermittent excitation pulse in a sequence of consecutive intermediate excitation pulses subsequent to the first excitation pulse:
      determining, for maintaining a temperature of the workpiece within the target temperature range, the respective intermittent excitation pulse by modifying one or more of a duration D of an immediately preceding excitation pulse, an amplitude A of the immediately preceding excitation pulse, or a spacing W between the immediately preceding excitation pulse and the respective intermittent excitation pulse;
      applying, using the thermal excitation device, the respective intermittent excitation pulse to the workpiece;
      capturing, using the imaging device, a respective intermittent iso-time frame of the workpiece; and
      determining a numerical fit of the first iso-time frame and the respective intermittent iso-time frame.

2. The method of claim 1, wherein the operations further comprise displaying, on a display, the first iso-time frame, the respective intermittent iso-time frame, the numerical fit of the first iso-time frame and the respective intermittent iso-time frame, a derivative of the numerical fit of the first iso-time frame and the respective intermittent iso-time frame, or attribute time frames.

3. The method of claim 1, wherein determining the target temperature range for the workpiece is based on the first excitation pulse.

4. The method of claim 1 wherein, when determining the respective intermittent excitation pulse for maintaining the temperature of the workpiece within the target temperature range, the immediately preceding excitation pulse comprises the first excitation pulse when the respective intermittent excitation pulse comprises a first one of the intermittent excitation pulses in the sequence of consecutive intermediate excitation pulses.

5. The method of claim 1, wherein determining the respective intermittent excitation pulse for maintaining the temperature of the workpiece within the target temperature range comprises operating the thermal excitation device for maintaining the temperature of the workpiece equal to a temperature that is within the target temperature range for the workpiece.

6. The method of claim 1, wherein the operations further comprise analyzing at least one image captured by the imaging device for identifying an anomaly of the workpiece from the numerical fit of the first iso-time frame and the respective intermittent iso-time frame.

7. The method of claim 6, wherein the operations further comprise identifying one or more discontinuities within the workpiece based on the identified anomaly of the workpiece.

8. The method of claim 7, wherein the one or more discontinuities include one or more voids or cavities within the workpiece.

9. The method of claim 8, wherein the one or more discontinuities include a first material disposed within the one or more voids or cavities within the workpiece, and wherein the first material is different than a second material surrounding the first material.

10. The method of claim 7, wherein the one or more discontinuities include a disbond region where a first outer layer of material of the workpiece may be otherwise bonded to or directly connected to a second inner layer of material of the workpiece.

11. A system for performing non-destructive testing of a workpiece using active thermography, the system comprising:
 a thermal excitation device;
 an imaging device;
 data processing hardware; and
 memory hardware in communication with the data processing hardware and storing instructions that when executed on the data processing hardware causes the data processing hardware to perform operations comprising:
  applying, using the thermal excitation device, a first excitation pulse to a workpiece;
  capturing, using the imaging device, a first iso-time frame of the workpiece;
  determining a target temperature range for the workpiece; and
  for each respective intermittent excitation pulse in a sequence of consecutive intermediate excitation pulses subsequent to the first excitation pulse:
   determining, for maintaining a temperature of the workpiece within the target temperature range, the respective intermittent excitation pulse by modifying one or more of a duration D of an immediately preceding excitation pulse, an amplitude A of the immediately preceding excitation pulse, or a spacing W between the immediately preceding excitation pulse and the respective intermittent excitation pulse;
   applying, using the thermal excitation device, the respective intermittent excitation pulse to the workpiece;
   capturing, using the imaging device, a respective intermittent iso-time frame of the workpiece; and
   determining a numerical fit of the first iso-time frame and the second respective intermittent iso-time frame.

12. The system of claim 11, wherein the operations further comprise displaying, on a display, the first iso-time frame, the second respective intermittent iso-time frame, the numerical fit of the first iso-time frame and the second respective intermittent iso-time frame, a derivative of the numerical fit of the first iso-time frame and the second respective intermittent iso-time frame, or attribute time frames.

13. The system of claim 11, wherein determining the target temperature range for the workpiece is based on the first excitation pulse.

14. The system of claim 11, wherein, when determining the respective intermittent excitation pulse for maintaining the temperature of the workpiece within the target temperature range, the immediately preceding excitation pulse comprises the first excitation pulse when the respective intermittent excitation pulse comprises a first one of the intermittent excitation pulses in the sequence of consecutive intermediate excitation pulses.

15. The system of claim 11, wherein determining the respective intermittent excitation pulse for maintaining the temperature of the workpiece within the target temperature range comprises operating the thermal excitation device for maintaining the temperature of the workpiece equal to a temperature that is within the target temperature range for the workpiece.

16. The system of claim 11, wherein the operations further comprise analyzing at least one image captured by the imaging device for identifying an anomaly of the workpiece from the numerical fit of the first iso-time frame and the respective intermittent iso-time frame.

17. The system of claim 16, wherein the operations further comprise identifying one or more discontinuities within the workpiece based on the identified anomaly of the workpiece.

18. The system of claim 17, wherein the one or more discontinuities include one or more voids or cavities within the workpiece.

19. The system of claim 18, wherein the one or more discontinuities include a first material disposed within the one or more voids or cavities within the workpiece, and wherein the first material is different than a second material surrounding the first material.

20. The system of claim 17, wherein the one or more discontinuities include a disbond region where a first outer layer of material of the workpiece may be otherwise bonded to or directly connected to a second inner layer of material of the workpiece.

* * * * *